United States Patent
Dawkins et al.

(10) Patent No.: US 11,301,259 B1
(45) Date of Patent: Apr. 12, 2022

(54) SYSTEM CONTROL PROCESSOR (SCP) CLONING SYSTEM

(71) Applicant: Dell Products L.P., Round Rock, TX (US)

(72) Inventors: William Price Dawkins, Lakeway, TX (US); Gaurav Chawla, Austin, TX (US); Mark Steven Sanders, Roanoke, VA (US); Elie Jreij, Pflugerville, TX (US); Robert W. Hormuth, Cedar Park, TX (US); Jimmy D. Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/068,923

(22) Filed: Oct. 13, 2020

(51) Int. Cl.
  *G06F 9/44* (2018.01)
  *G06F 9/4401* (2018.01)
  *G06F 9/445* (2018.01)

(52) U.S. Cl.
  CPC ........ *G06F 9/4403* (2013.01); *G06F 9/44505* (2013.01)

(58) Field of Classification Search
  CPC ..... G06F 1/32; G06F 1/12; G06F 9/44; G06F 21/57
  See application file for complete search history.

(56) References Cited

U.S. PATENT DOCUMENTS

| | | | |
|---|---|---|---|
| 8,527,640 B2 | 9/2013 | Reisman | |
| 2008/0005233 A1* | 1/2008 | Cai | H04L 67/02 709/204 |
| 2009/0228883 A1* | 9/2009 | Gebhart | G06F 9/45533 718/1 |
| 2014/0351934 A1* | 11/2014 | Mitra | G06F 21/567 726/23 |
| 2015/0134612 A1* | 5/2015 | Silberstein | G06F 16/27 707/634 |
| 2015/0286452 A1* | 10/2015 | Kim | H04N 1/00103 358/1.13 |
| 2018/0157677 A1* | 6/2018 | Bafna | G06F 3/064 |

* cited by examiner

Primary Examiner — Keshab R Pandey
(74) Attorney, Agent, or Firm — Joseph Mencher

(57) ABSTRACT

A System Control Processor (SCP) cloning system includes a first computing system coupled to second computing systems via a network. The first computing system includes a first SCP subsystem coupled to a central processing system and first computing system components in the first computing system. The first SCP subsystem receives a first cloning command via the network from a management system and, based on the first cloning command, retrieves respective first SCP component state information from each of a plurality of first SCP components that are included in the first SCP subsystem, uses the respective first SCP component state information to generate a first SCP subsystem image that is configured for installation on an SCP subsystem to configure that SCP subsystem the same as the first SCP subsystem, and transmits the first SCP subsystem image to a second SCP subsystem in each of at least one second computing system.

20 Claims, 17 Drawing Sheets

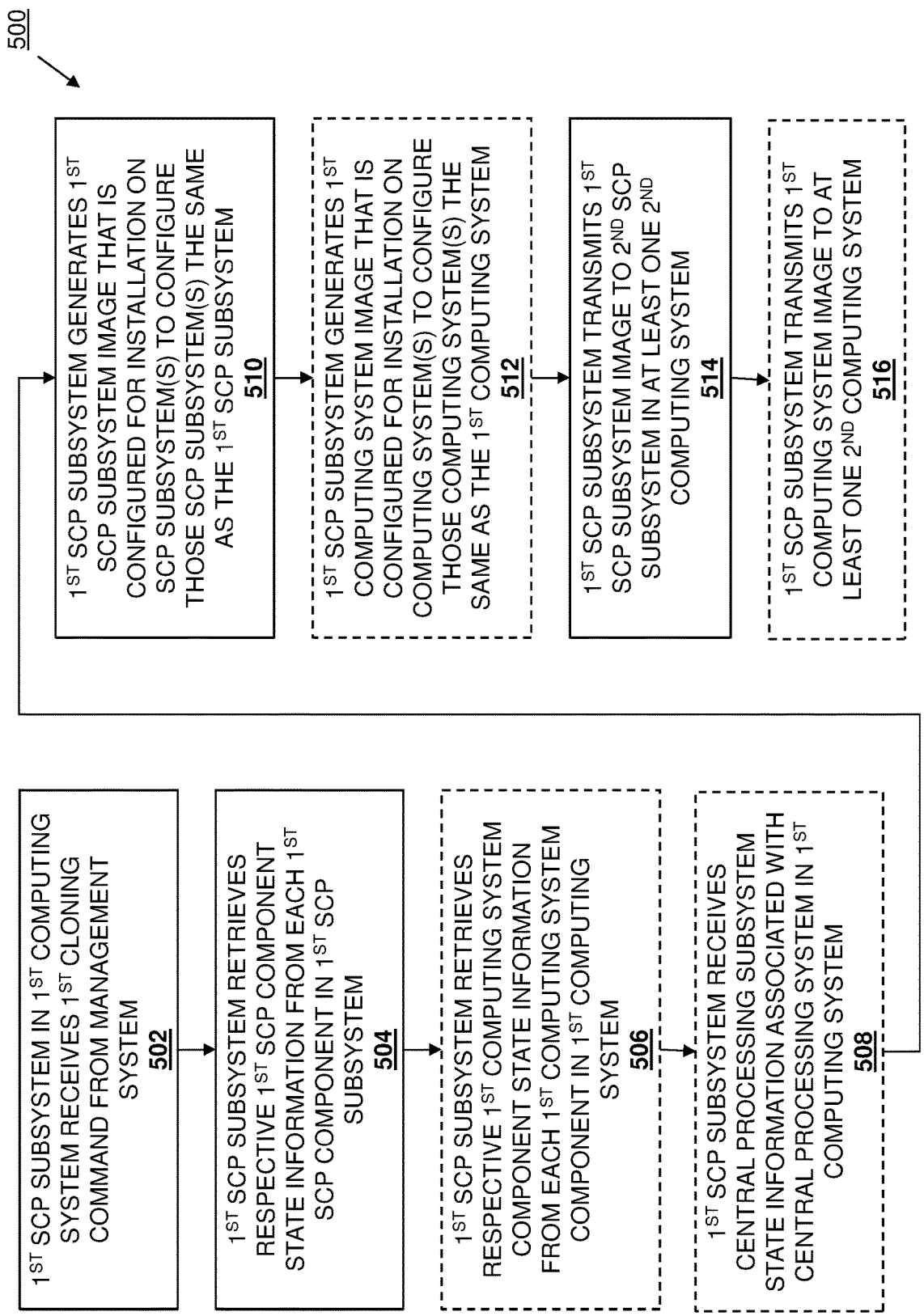

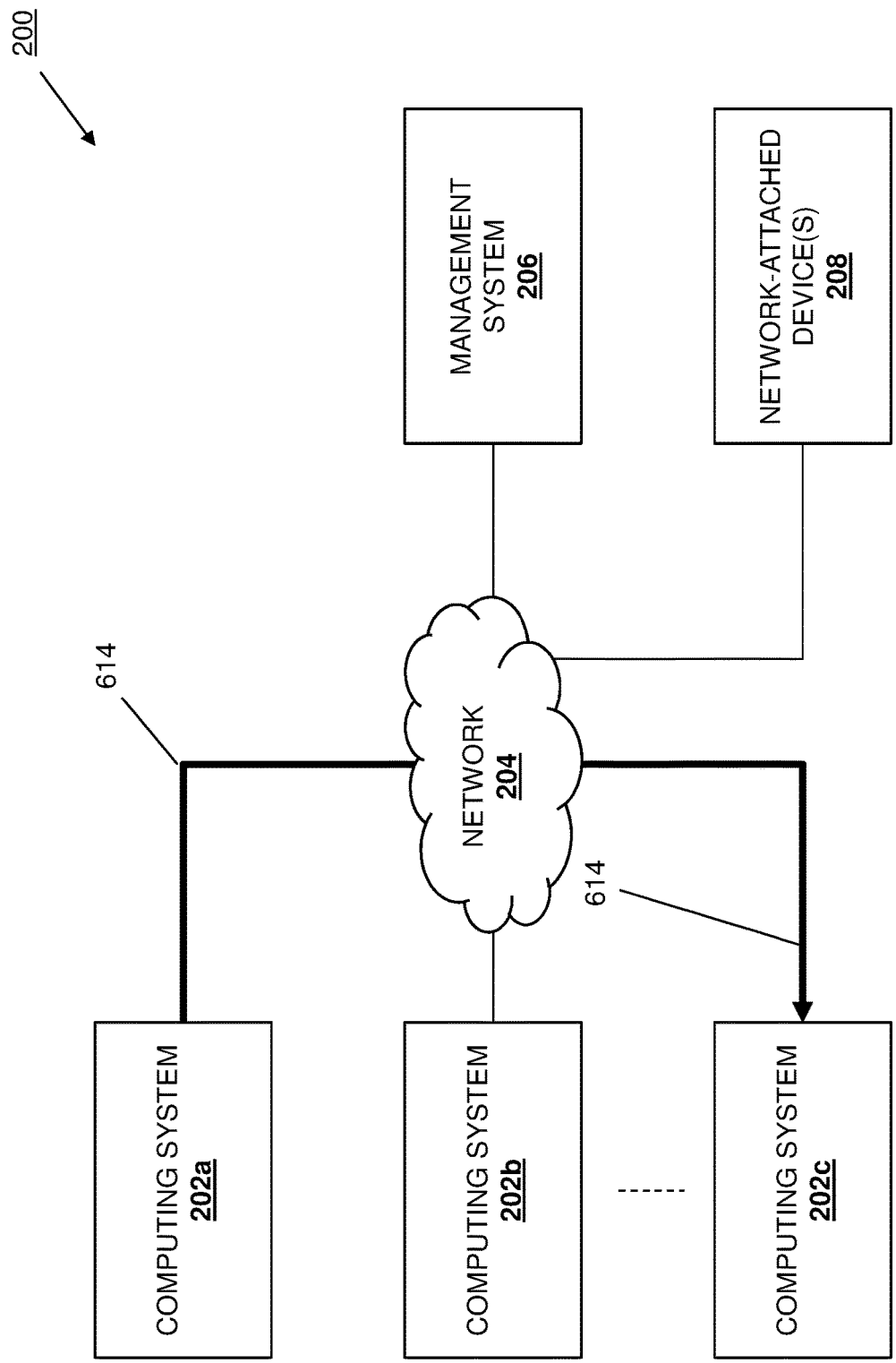

SYSTEM CONTROL PROCESSOR (SCP) CLONING SYSTEM

BACKGROUND

The present disclosure relates generally to information handling systems, and more particularly cloning a System Control Processor (SCP) subsystem included in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems known in the art may be "cloned" in order to, for example, replicate a first server device on at least one second server device such that the second server device(s) operate like the first server device but without the need to configure the second server device(s) "from scratch". For example, telecom providers, Internet and/or other service providers, enterprises, and/or other server device users known in the art may utilize large numbers of server devices (e.g., server device "clusters") to perform the same (or substantially similar) operations. As such, server device users may configure one or more server devices according to desired configuration(s), and may then clone any of those server device(s) (e.g., up to hundreds of times) in order to relatively quickly and efficiently create cluster(s) of server devices that are all configured to perform desired operations. Furthermore, rather than cloning newly-configured server devices, a computing system user may instead clone one or more server devices after those server devices have been operating for some time.

Conventional server devices do not include any "built-in" or integrated subsystem for performing such cloning operations, and instead require the provisioning of cloning software on any server device that is being cloned. Such cloning software typically operates by collecting server device state information from components in a first server device, generating a server device cloning image using that server device state information, and then installing that server device cloning image on second server device(s) to cause the second server device(s) to operate in the same (or a substantially similar) manner as the first server device. However, while such cloning operations provide for the cloning of conventional server devices, issues arise when server devices are provided with subsystems that generate their own subsystem state information that is inaccessible to cloning software running on the server device, which prevents the creation of a clone of that server device/subsystem combination. For example, the inventors of the present disclosure have developed a System Control Processor (SCP) subsystem that may be provided in server devices and/or other computing systems in order to provide communication functionality (e.g., Network Interface Controller (NIC) functionality) for the server device/computing system, while also performing perform a variety of advanced functionality for that server device/computing system. However, in the process of the operation of the SCP subsystem, SCP components included in and/or connected to the SCP subsystem generate SCP subsystem state information, and that SCP subsystem state information is not accessible to cloning software in the server device/computing system. As such, conventional techniques for cloning server devices and/or other computing systems are not sufficient to fully replicate a server device/computing system including an SCP subsystem.

Accordingly, it would be desirable to provide an SCP cloning system that addresses the issues discussed above.

SUMMARY

According to one embodiment, a System Control Processor (SCP) subsystem includes a System Control Processor (SCP) processing system; and an SCP memory system that is coupled to the SCP processing system and that includes instructions that, when executed by the SCP processing system, cause the SCP processing system to provide an SCP cloning engine that is configured to: receive, via a network from a management system, a first cloning command; retrieve, based on the first cloning command, respective first SCP component state information from each of a plurality of first SCP components that are included in a first SCP subsystem; generate, using the respective first SCP component state information and based on the first cloning command, a first SCP subsystem image that is configured for installation on an SCP subsystem to configure that SCP subsystem the same as the first SCP subsystem; and transmit, based on the first cloning command, the first SCP subsystem image to a second SCP subsystem in each of at least one second computing system.

BRIEF DESCRIPTION OF THE DRAWINGS

FIG. 5 is a flow chart illustrating an embodiment of a method for cloning an SCP subsystem.

FIG. 6J is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
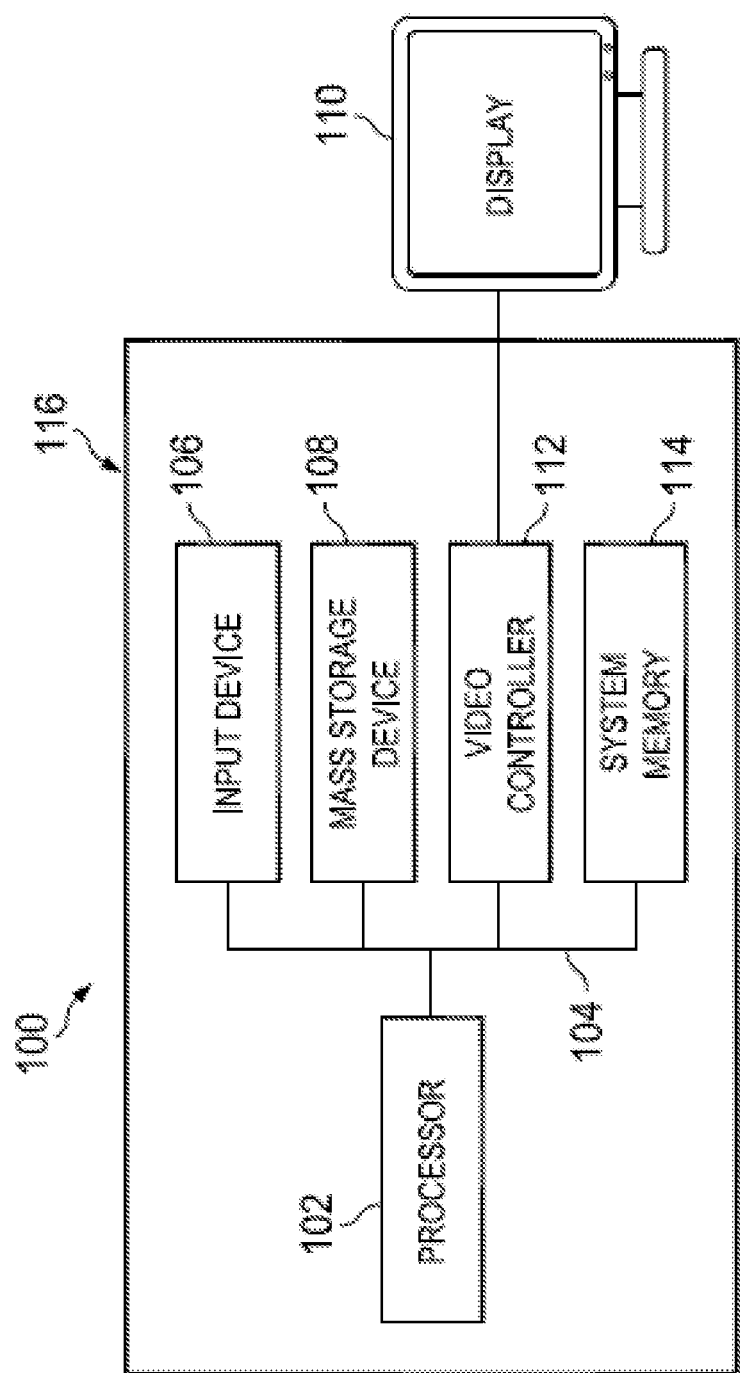
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
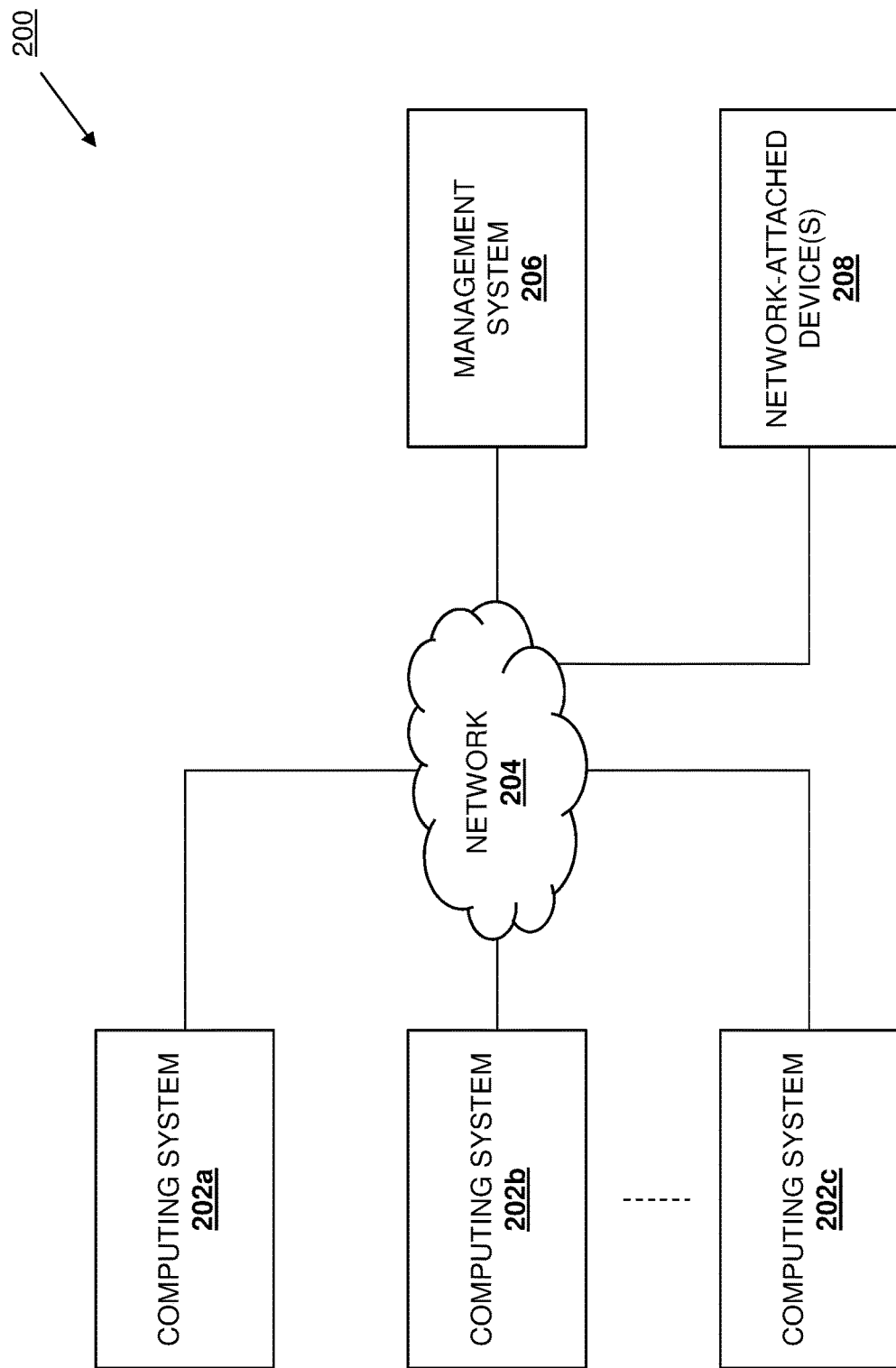
FIG. 2 is a schematic view illustrating an embodiment of a networked system.

Referring now to FIG. 2, an embodiment of a networked system 200 is illustrated in which the SCP cloning system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c (e.g., an SCP manager for the SCP subsystems included in the computing systems 202a-202c discussed below, a computing system cloning administrator/orchestration platform, etc.). In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the SCP cloning system of the present disclosure may be utilized with a variety of components and component configurations, and/ or may be provided in a variety of computing system/ network configurations, while remaining within the scope of the present disclosure as well.

Figure 3A:
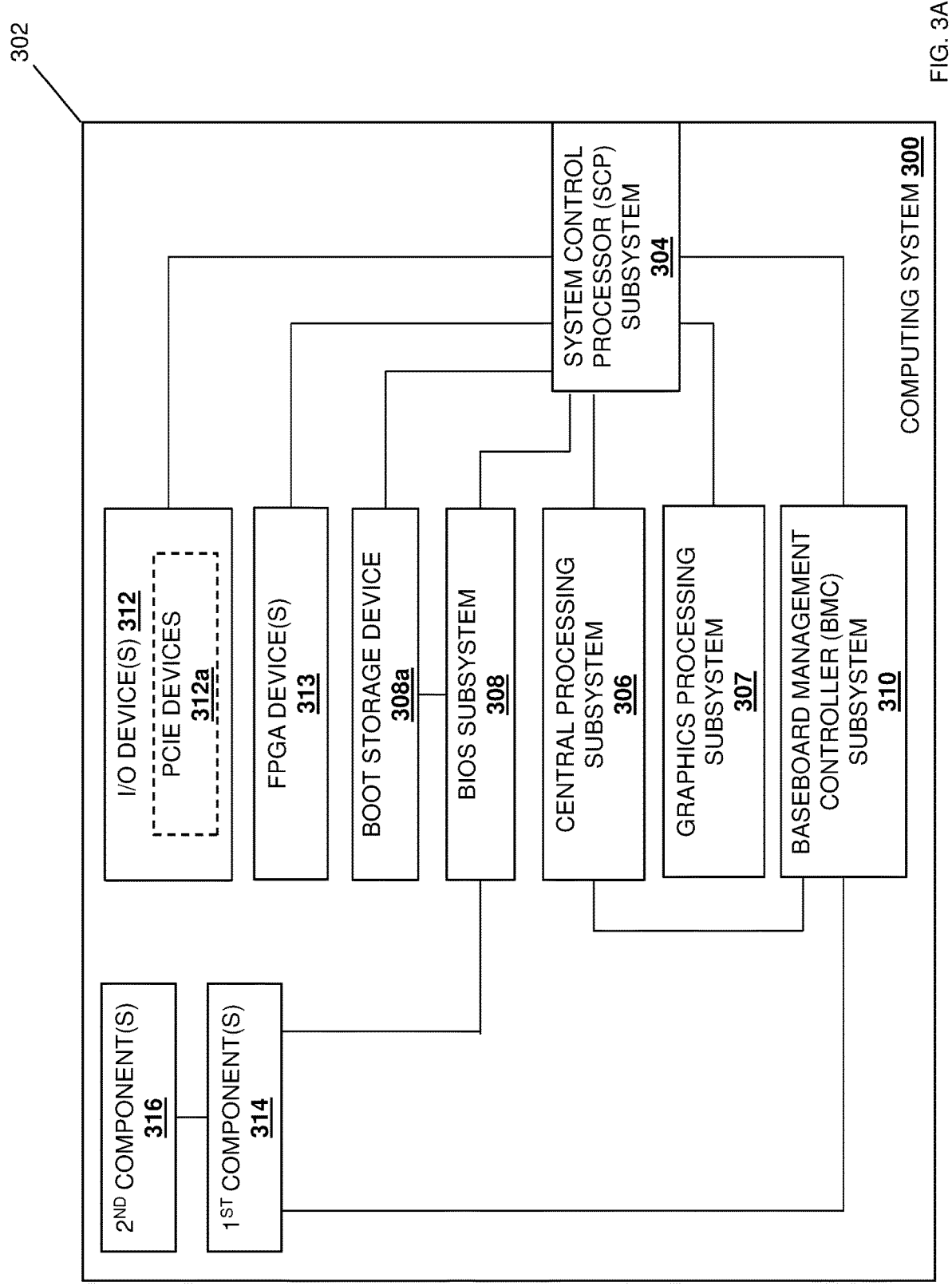
FIG. 3A is a schematic view illustrating an embodiment of a computing system that may be included in the networked system of FIG. 2 and that may utilize the SCP cloning system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing system that are configured to operate similarly as the computing system 300 discussed below. In the illustrated embodiment, the computing system 300 includes a chassis 302 that houses the components of the computing system 300, only some of which are illustrated below.

For example, the chassis 302 may house a System Control Processor (SCP) subsystem 304 that is provided according to the teachings of the present disclosure to perform the SCP cloning functionality that is discussed in further detail below. In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a boot storage device 308a that is coupled to the SCP subsystem 304 and the BIOS subsystem 308, and that one of skill in the art in possession of the present disclosure will recognize may store a boot image that may be accessible to and utilized by the BIOS subsystem 308 during boot operations. For example, the boot storage device 308a may be provided by Boot Optimized Storage Solution (BOSS) available from DELL® Inc. of Round Rock, Tex., United States, although other boot storage devices will fall within the scope of the present disclosure as well. In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure.

The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well. The chassis 302 may also house one or more Field Programmable Gate Array (FPGA) device(s) 313 that are coupled to the SCP subsystem 304, and that as discussed below may be programmed to perform any of a variety of functions for the computing system 300 and/or the SCP subsystem 304.

Figure 3B:
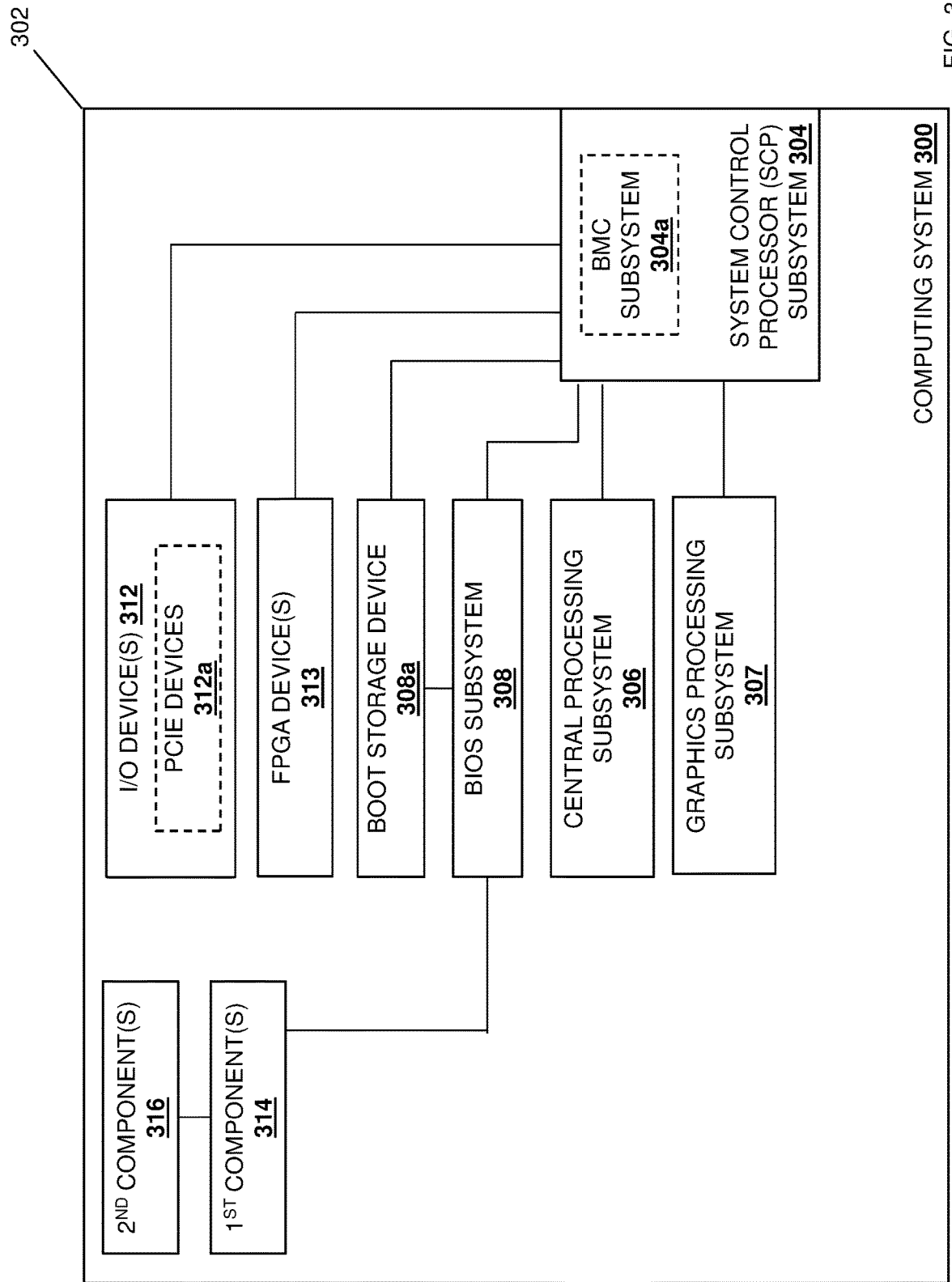
FIG. 3B is a schematic view illustrating an embodiment of a computing device that may be included in the networked system of FIG. 2 and that may utilize the SCP cloning system of the present disclosure.

The chassis 302 may also house one or more first components 314 that are coupled to each of the BIOS subsystem 308 and the BMC subsystem 310, and one or more second components 316 that are coupled to at least one of the first components 314. In specific examples, the first component(s) 314 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
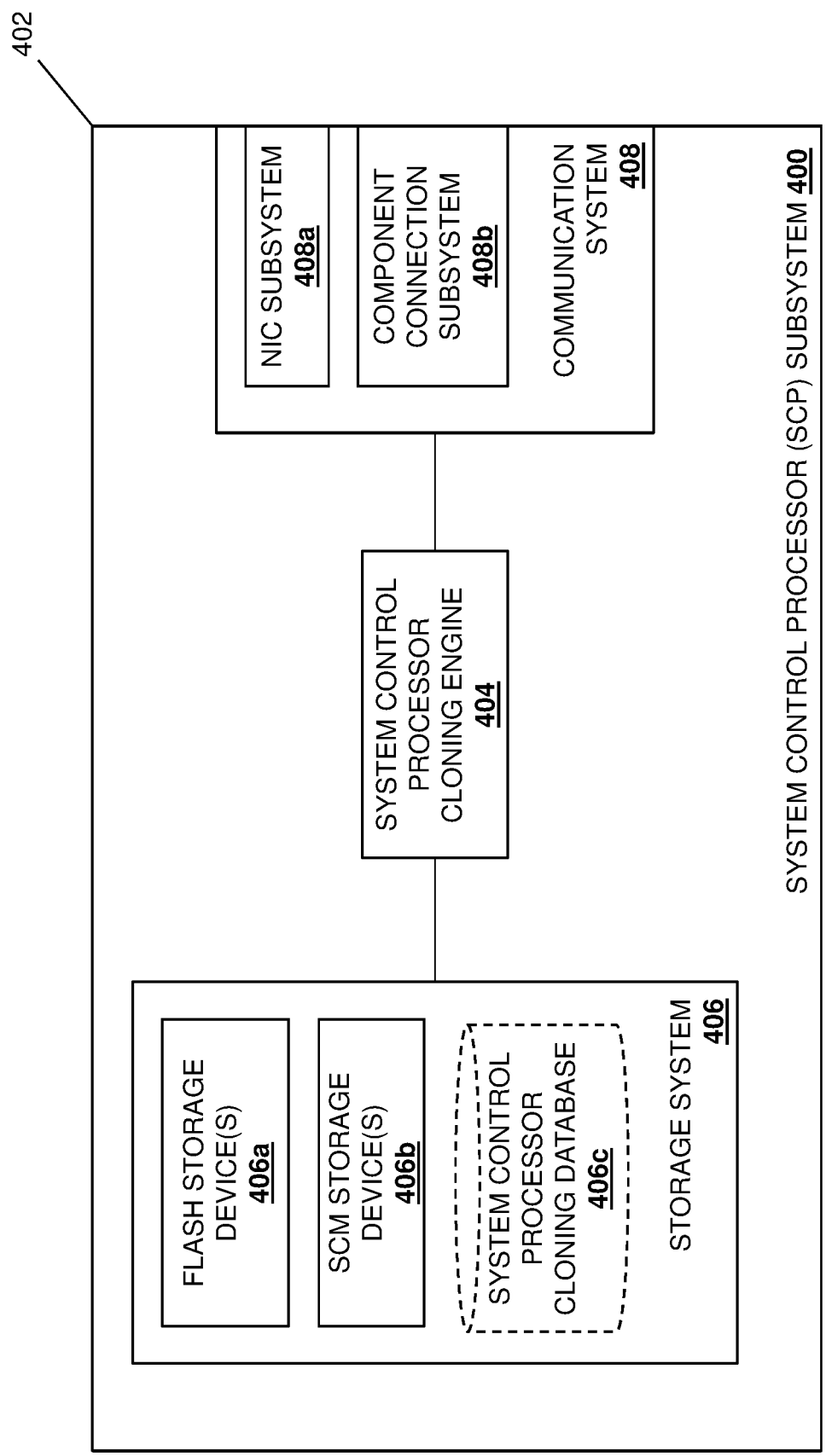
FIG. 4 is a schematic view illustrating an embodiment of an SCP subsystem that may be included in the computing device of FIG. 3A or 3B, and that may provide the SCP cloning system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 400, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 302 may support an SCP processing system including one or more SCP processors (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP cloning engine 404 that is configured to perform the functionality of the SCP cloning engines and/or SCP subsystems discussed below. In a specific example, the SCP processing system providing the SCP cloning engine 404 may be provided by ARM cores in an ARM-based processor, although other processing systems will fall within the scope of the present disclosure as well.

The chassis 302 may also support a storage system 406 (e.g., which may include the storage 108 discussed above with reference to FIG. 1, the SCP memory system discussed above, etc.) that is coupled to the SCP engine 404 (e.g., via a coupling between the storage system and the SCP processing system) and that, in the illustrated embodiment, includes one or more flash storage device(s) 406a, and one or more Storage Class Memory (SCM) storage devices 406b. However, while a few specific storage devices are illustrated and described below, one of skill in the art in possession of the present disclosure will appreciate that the storage system 406 may include a variety of other storage devices that will fall within the scope of the present disclosure as well. As illustrated, the storage system 406 may provide an SCP cloning database 406c that may include SCP subsystems settings, as well as any information utilized by the SCP cloning engine 404 to perform the functionality discussed below.

The chassis 402 may also support a communication system 408 that is coupled to the SCP engine 404 (e.g., via a coupling between the communication system 408 and the SCP processing system) and that, in the illustrated embodiment, includes a Network Interface Controller (NIC) subsystem 408a (e.g., an Ethernet subsystem) that is configured to connect the SCP subsystem 400 to the network 204 discussed above with reference to FIG. 2, a component connection subsystem 408b that is configured to couple the SCP subsystem 400 to any of the components included in and/or connected to the computing system 300 of FIGS. 3A and 3B, as well as any other communication components (e.g., wireless communication systems (e.g., BLUETOOTH®, Near Field Communication (NFC) components, WiFi components, etc.)) that would be apparent to one of skill in the art in possession of the present disclosure.

As such, the communication system 408 may include any of the connections discussed below between the SCP subsystem 400 and the network 204, the central processing subsystem 306, the graphics processing subsystem 307, the BIOS subsystem 308, the boot storage device 308a, the BMC subsystem 310, the I/O device(s) 312, and/or any other components utilized with the computing system 202a/300. For example, the component connection subsystem 408b may include a CxL Root .mem/.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components (e.g., a local memory, embedded FPGA device(s), a Non-Volatile Memory express (NVMe) emulation subsystem between the SCP cloning engine 404 and the CxL Root .mem/.cache subsystem discussed above, etc.) and/or component configurations for providing the functionality discussed below while remaining within the scope of the present disclosure as well.

Referring now to FIG. 5, an embodiment of a method 500 for cloning an SCP subsystem is illustrated. As discussed below, the systems and methods of the present disclosure provide an SCP subsystem that includes built-in cloning functionality that provides for the copying of state information from SCP components in the SCP subsystem, which allows for the cloning of that SCP subsystem along with the cloning of the computing system in which it is provided, enabling the replication of any computing system/SCP subsystem combination on any other computing system/SCP subsystem combination(s). For example, the SCP cloning system of the present disclosure may include a first computing system with a first SCP subsystem coupled to a central processing system and first computing system components in the first computing system. The first SCP subsystem receives a first cloning command via a network from a management system and, based on the first cloning command, retrieves respective first SCP component state information from each of a plurality of first SCP components that are included in the first SCP subsystem, uses the respective first SCP component state information to generate a first SCP subsystem image that is configured for installation on an SCP subsystem to configure that SCP subsystem the same as the first SCP subsystem, and transmits the first SCP subsystem image to a second SCP subsystem in each of at least one second computing system via the network. Furthermore, in some embodiments, the cloning functionality in the SCP subsystem may provide for the copying of state information from computing system components in its computing system as well in order to allow for the cloning of that computing system, thus offloading (or substantially offloading) cloning operations from that computing system.

The method 500 begins at block 502 where a first SCP subsystem in a first computing system receives a first cloning command from a management system. In an embodiment, prior to or during the method 500, a network administrator or other user may configure the computing system 202a/300 and its SCP subsystem 304/400 such that that computing system 202a/300 and its SCP subsystem 304/400 are configured to perform any of a variety of operations and/or functionality in a desired manner. As discussed above, the configuration of the computing system 202a/300 and its SCP subsystem 304/400 may be performed in anticipation of the cloning of that computing system 202a/300 and its SCP subsystem 304/400 in order to create a cluster of computing systems. Thus, in some examples, the cloning operations discussed below may be performed immediately following the configuration of the computing system 202a/300 and its SCP subsystem 304/400. However, in other examples, the cloning operations discussed below may be performed following the configuration and subsequent operation of the computing system 202a/300 and its SCP subsystem 304/400 for some amount of time. However, while two specific examples have been provided, one of skill in the art in possession of the present disclosure will appreciate that the cloning operations discussed below may be performed in a variety of scenarios that will fall within the scope of the present disclosure as well.

In an embodiment, at block 502, the SCP subsystem 304/400 in the computing system 202a/300 may receive a cloning command. In one example, the network administrator or other user discussed above may utilize the management system 206 (e.g., an SCP manager) to identify an address of the SCP subsystem 304/400 in the computing system 202a/300 that will create the cloning image discussed below, along with a number of clones to create using that cloning image and, in some embodiments, the identity of SCP subsystem(s) and/or computing system(s) to which that cloning image should be provided. In response, the management system 206 may identify SCP subsystem(s) and/or computing system(s) with compatible SCP capabilities (e.g., cloning capabilities) and, in response, generate the cloning command.

Figure 6A:
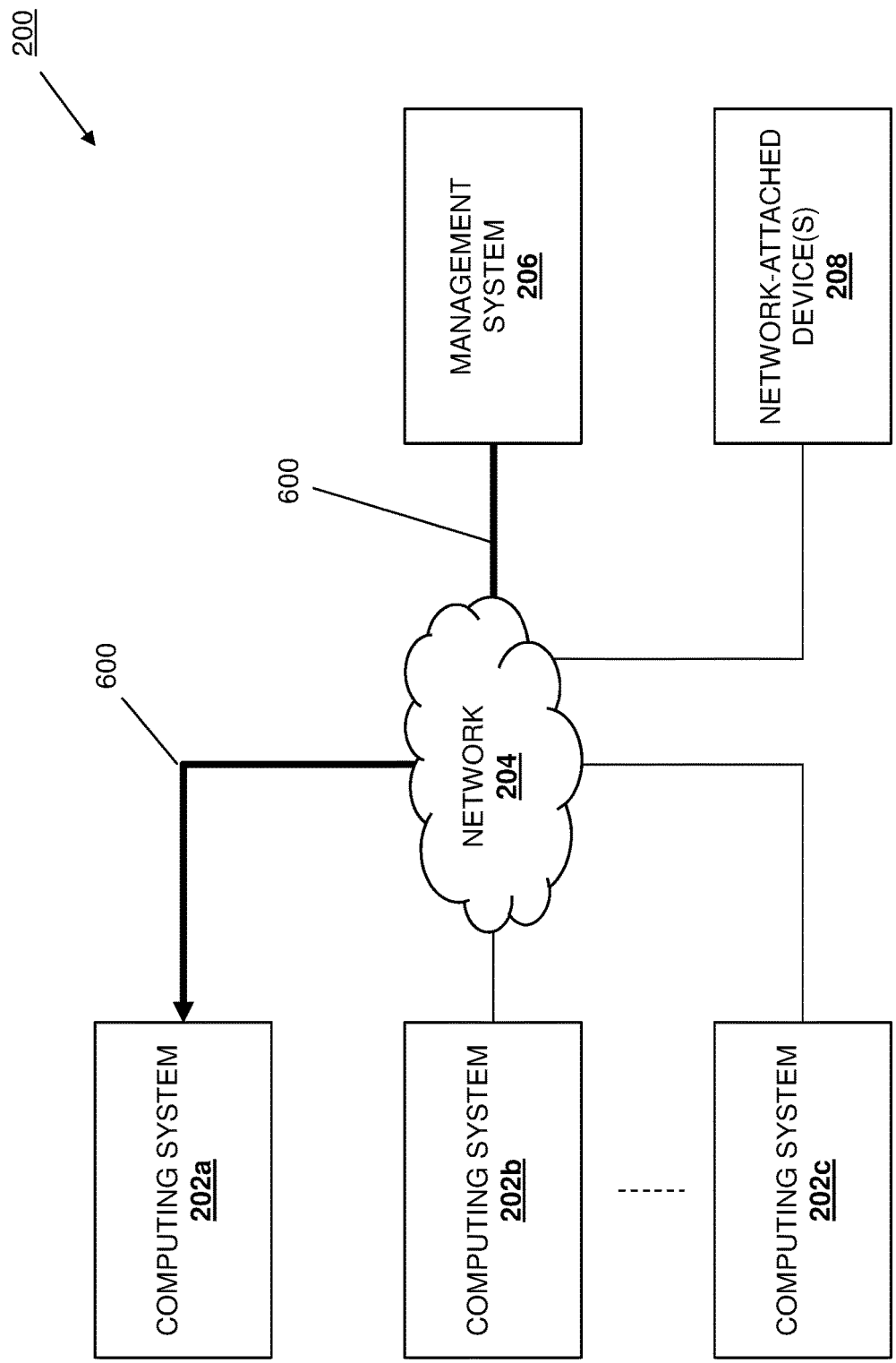
FIG. 6A is a schematic view illustrating an embodiment of the networked system of FIG. 2 operating during the method of FIG. 5.
Figure 6B:
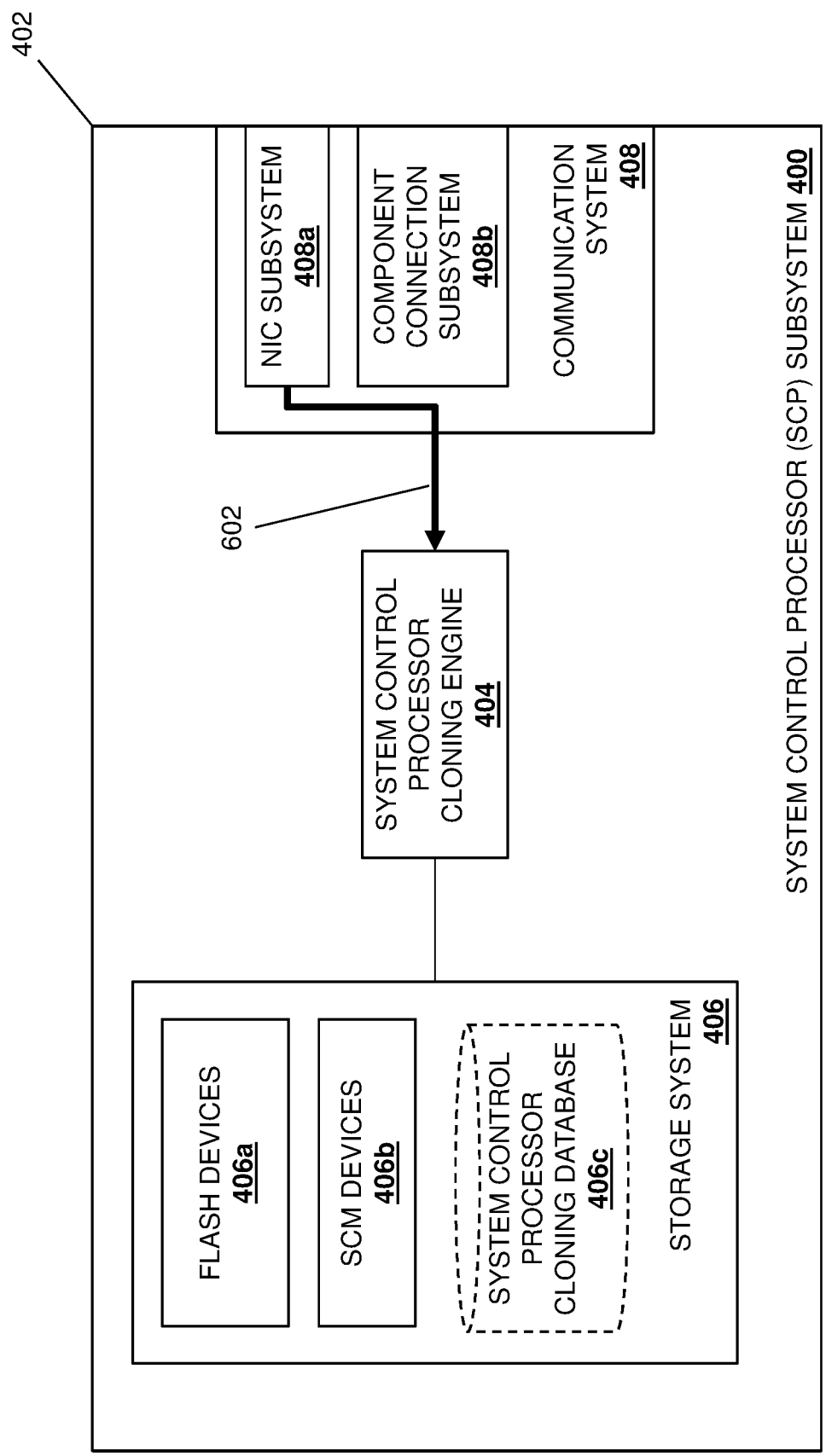
FIG. 6B is a schematic view illustrating an embodiment of the SCP subsystem of FIG. 4 operating during the method of FIG. 5.
Figure 6C:
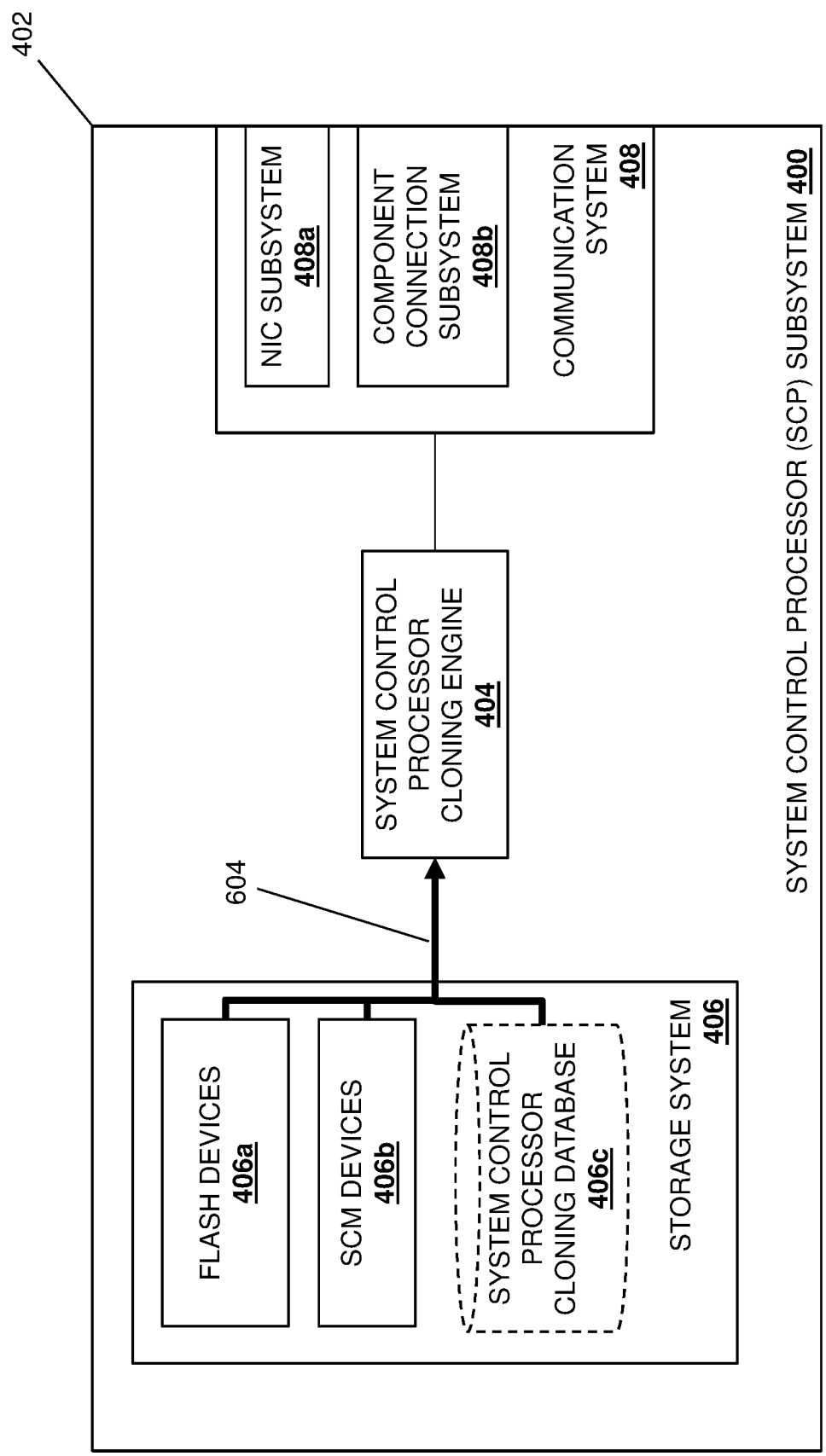
FIG. 6C is a schematic view illustrating an embodiment of the SCP subsystem of FIG. 4 operating during the method of FIG. 5.

With reference to FIG. 6A, at block 502 the management system 206 may perform cloning command transmission operations 600 that include transmitting the cloning command via the network 204 to the computing system 202a. As discussed herein, the cloning command generated and transmitted by the management system 206 to the computing system 202a/300 may include instructions to clone the SCP subsystem 304/400 in the computing system 202a/300, instructions to clone the computing system 202a/300, the identity of SCP subsystem(s) in the networking system 200 that should be cloned from the SCP subsystem 304/400, the identity of computing system(s) in the networked system 200 that should be cloned from the computing system 202a/300, and/or any other cloning command information that would be apparent to one of skill in the art in possession of the present disclosure. In some specific examples discussed in further detail below, the cloning command may include a geometric progression cloning map that details how cloning operations should be performed by the computing system 202a/300 and, in some embodiments, other computing systems in the networked system 200. As such, with reference to FIG. 6B, the SCP cloning engine 404 in the SCP subsystem 304/400 may perform cloning command receiving operations 602 to receive the cloning command transmitted by the management system 206 via the NIC subsystem 408a in the communication system 408.

The method 500 then proceeds to block 504 where the first SCP subsystem retrieves respective first SCP component state information from each first SCP component in the first SCP subsystem. In an embodiment, at block 504, the SCP cloning engine 404 in the SCP subsystem 304/400 included in the computing system 202a/300 may operate to execute the cloning command received from the management system 206 (e.g., the instructions to clone the SCP subsystem 304/400 in the computing system 202a/300 discussed above) and, in response, suspend its operations, and perform SCP component state information retrieval operations 604 that may include, for example, retrieving flash device state information from the flash device(s) 406a included in the storage system 406, retrieving SCM device state information from the SCM device(s) 406b included in the storage system 406, retrieving SCP cloning database state information from the SCP cloning database 406c included in the storage system 406, and/or retrieving SCP component state information from any other SCP component that would be apparent to one of skill in the art in possession of the present disclosure.

In a specific example, the flash device state information retrieved from the flash device(s) 406a may include any data that is stored on those flash device(s) 406a. In another specific example, the SCM device state information retrieved from the SCM device(s) 406b may include any data that is stored on those SCM device(s) 406b. In yet another specific example, the SCP cloning database state information retrieved from the SCP cloning database 406c may include any SCP settings that are stored in the SCP cloning database 406c. Furthermore, one of skill in the art in possession of the present disclosure will recognize that the SCP component state information retrieved at block 504 may include programming instructions provided with the SCP processing system that provides the SCP cloning engine 404, data stored on the SCP memory system that provides the SCP cloning engine 404, any settings associated with the SCP subsystem, the processor state associated with the any processors included in the SCP subsystem, and/or any other state information that one of skill in the art in possession of the present disclosure would recognize may be produced by, provided for, and/or otherwise associated with the SCP subsystem 304/400, and that may be utilized to provide for the SCP cloning operations discussed in further detail below.

The method 500 may then proceed to optional block 506 where the first SCP subsystem may retrieve respective first computing system component state information from each first computing system component in the first computing system. As discussed in further detail below, in some embodiments the cloning functionality provided in the SPC subsystem 304/400 in the computing system 202a/300 according to the teachings of the present disclosure may only provide for the cloning of the SCP subsystem 304/400 in the computing system 202a/300, which one of skill in the art in possession of the present disclosure will appreciate does not require the performance of optional blocks 506 and 508 in order to allow for the cloning of that SCP subsystem 304/400 in the computing system 202a/300 on other SCP subsystems including in the computing systems 202b and up to 202c. As such, in embodiments in which the SPC subsystem 304/400 in the computing system 202a/300 is only providing for the cloning of that SCP subsystem 304/400, optional blocks 506 and 508 may be skipped.

However, as also discussed in further detail below, in some embodiments the cloning functionality provided in the SPC subsystem 304/400 in the computing system 202a/300 according to the teachings of the present disclosure may provide for the cloning of the computing system 202a/300 along with the SCP subsystem 304/400 included therein, which one of skill in the art in possession of the present disclosure will appreciate may include the performance of optional block 506 and, in some cases optional block 508, in order to allow for the cloning of the combination of that computing system 202a/300 and SCP subsystem 304/400 on other computing system/SCP subsystem combinations in the networked system 200. As such, in embodiments in which the SPC subsystem 304/400 is providing for the cloning of itself and the computing system 202a/300, optional block 506 may be performed.

Figure 6D:
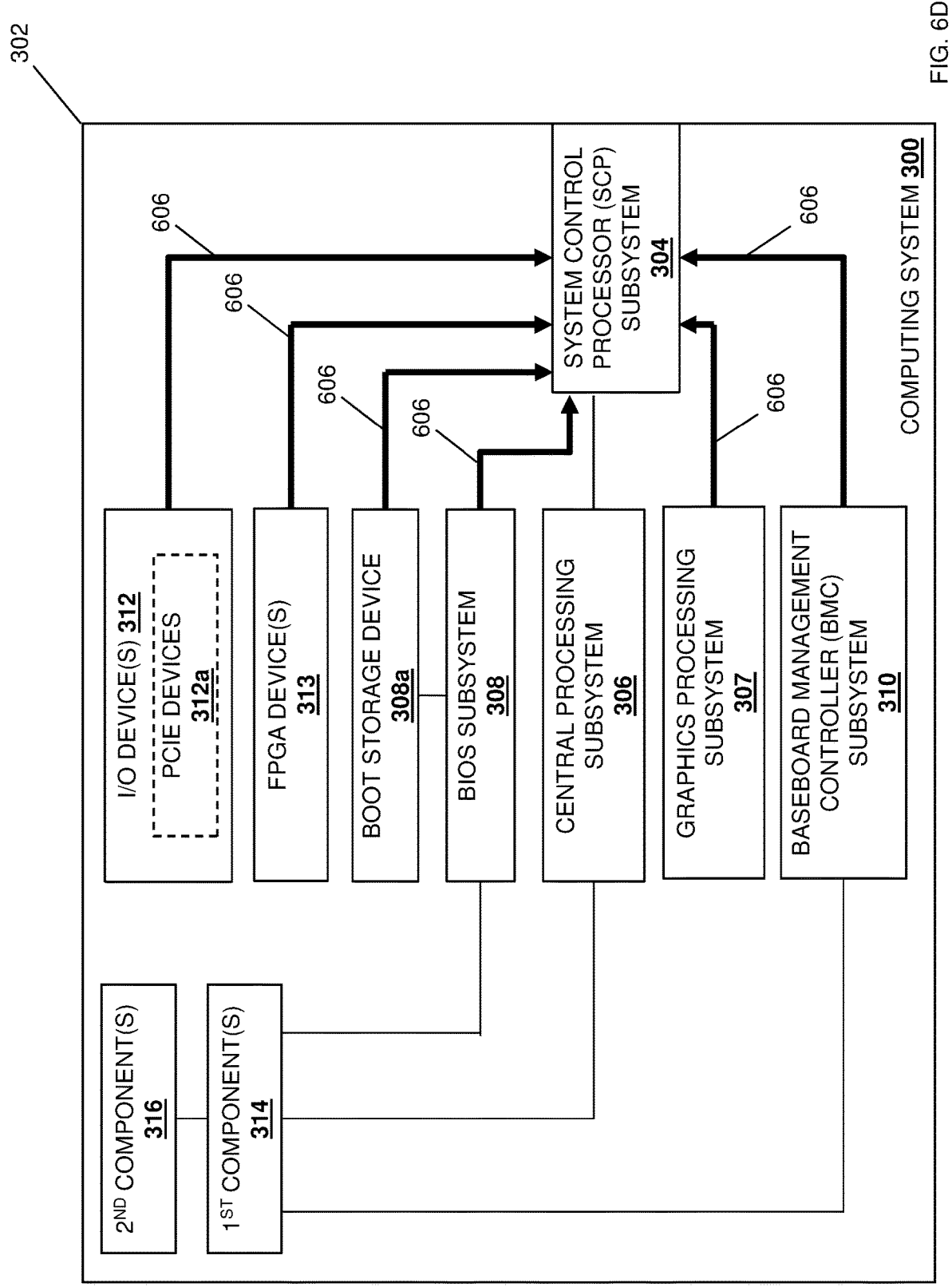
FIG. 6D is a schematic view illustrating an embodiment of the computing system of FIG. 3A operating during the method of FIG. 5.

With reference to FIG. 6D and in an embodiment of optional block 506, the SCP cloning engine 404 in the SCP subsystem 304/400 included in the computing system 202a/300 may operate to execute the cloning command received from the management system 206 (e.g., the instructions to clone the computing system 202a/300 discussed above) and, in response, perform computing system component state information retrieval operations 606 that may include, for example, retrieving BMC subsystem state information from the BMC subsystem 210, retrieving graphics processing subsystem state information from the graphics processing subsystem 307, retrieving BIOS subsystem state information from the BIOS subsystem 308, retrieving boot storage device state information from the boot storage device 308a, retrieving FPGA device state information from the FPGA device(s) 313, retrieving I/O device state information from the I/O device(s) 312, and/or retrieving computing system component state information from any other computing system component that would be apparent to one of skill in the art in possession of the present disclosure. For example, while not explicitly illustrated or described in detail herein, the SCP cloning engine 404 in the SCP subsystem 304/400 included in the computing system 202a/300 may also retrieve state information from any network-attached device (e.g., network-attached storage devices such as NVMe storage devices, storage volumes on external storage arrays, etc.) needed to create a complete clone of that SCP subsystem.

In a specific example, the BMC state information retrieved from the BMC subsystem 310 may include any BMC settings included in the BMC subsystem 310 and/or data stored in a local memory in the BMC subsystem 310. In another specific example, the graphics processing subsystem state information retrieved from the graphics processing subsystem 307 may include any data that is stored on a graphics processing memory in the graphics processing subsystem 307 (which may be accessible to the SCP subsystem 304/400 because the SCP subsystem 304/400 provides the host for the graphics processing system 307, as discussed above). In yet another specific example, the BIOS subsystem state information retrieved from the BIOS subsystem 308 may include any BIOS settings that are provided in the BIOS subsystem 308. In yet another specific example, the boot device storage state information retrieved from the boot storage device 308a may include a boot image that is stored on the boot storage device 308a. In yet another specific example, the FPGA device state information retrieved from the FPGA device(s) 313 may include FPGA programming (e.g., FPGA bitstream(s)) provided in the FPGA device(s) 313. In yet another specific example, the I/O device(s) 312 may include NVMe storage devices and the I/O device state information retrieved from the I/O device(s) may include any data stored on the NVMe storage devices.

Figure 6E:
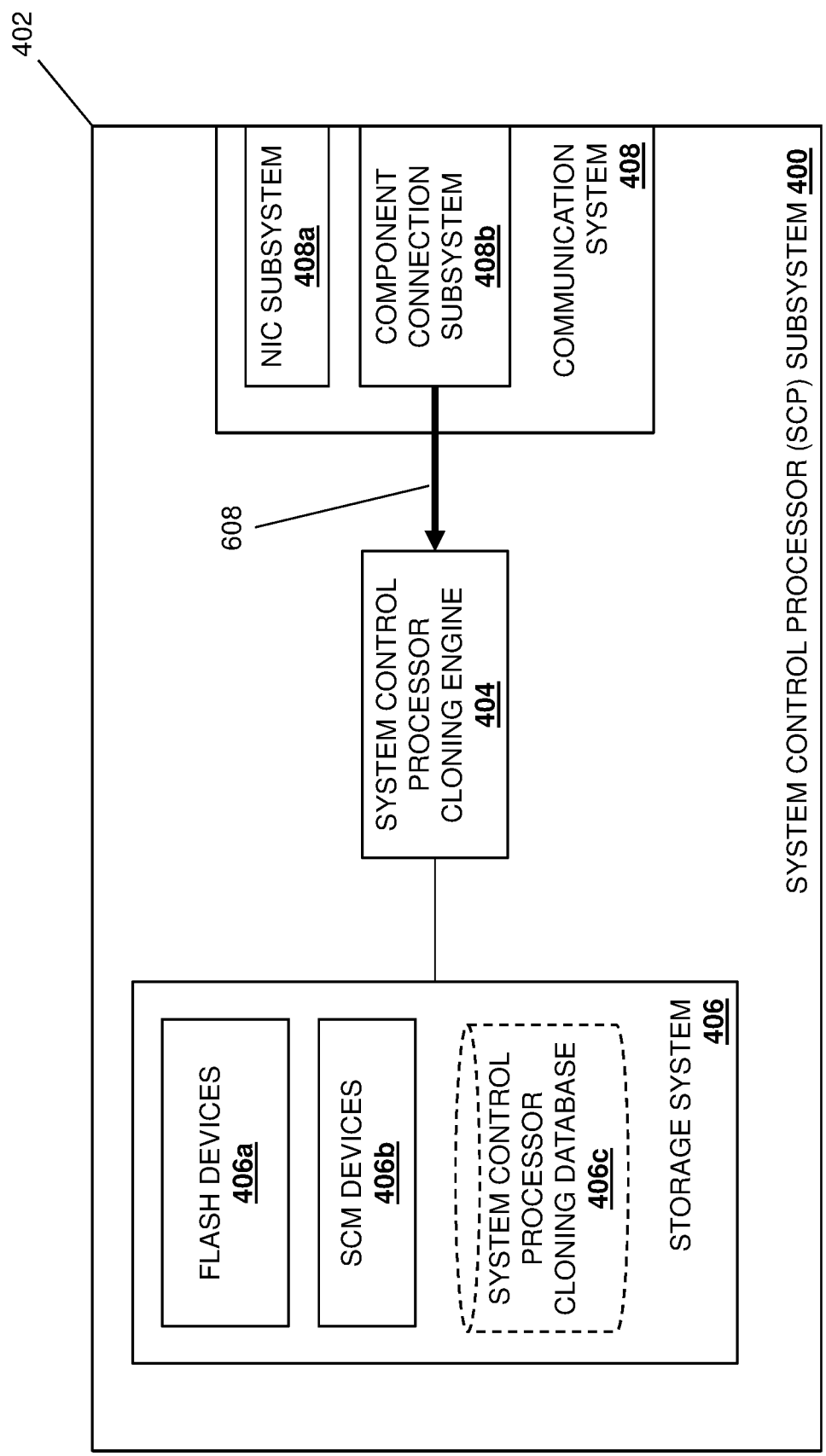
FIG. 6E is a schematic view illustrating an embodiment of the SCP subsystem of FIG. 4 operating during the method of FIG. 5.

Furthermore, one of skill in the art in possession of the present disclosure will recognize that the computing system component state information retrieved at optional block 506 may include any other state information that one of skill in the art in possession of the present disclosure would recognize may be produced by, provided for, and/or otherwise associated with the computing system 202a/300 (e.g., state information for accelerator device(s) or peripheral device(s) accessible by the SCP subsystem), and that may be utilized to provide for the computing system cloning operations discussed in further detail below. As such, with reference to FIG. 6E, the SCP cloning engine 404 in the SCP subsystem 304/400 may perform computing system component state information receiving operations 608 to retrieve the computing system component state information from each of the graphics processing subsystem 307, the BIOS subsystem 308, the boot storage device 308a, the BMC subsystem 310, the FPGA device(s) 313, and the I/O device(s) 312 via the component connection subsystem 408b in the communication system 408.

The method 500 may then proceed from optional block 506 to optional block 508 where the first SCP subsystem may receive central processing subsystem state information associated with a central processing subsystem in the first computing system. As will be appreciated by one of skill in the art in possession of the present disclosure, in some embodiments the SCP subsystem 304 may not have access to computing system component state information in computing system component(s) in the computing system 202a/300, and thus may require some functionality on the computing system component(s) and/or the computing system 202a/300 to provide that computing system component state information to the SCP subsystem 304/400. For example, in the embodiment described above with reference to optional block 506, the SCP subsystem 304/400 does not have access to central processing subsystem state information for the central processing system 306 (e.g., x86 host processor state information for an x86 host processor that is stored in an x86 memory that is inaccessible to the SCP subsystem 304/400), and thus may require some functionality on the central processing system 306 and/or computing system 202a/300 in order to capture the central processing subsystem state information from the central processing subsystem 306. As such, limited cloning software and/or other functionality may be provided on the central processing system 306 and/or computing system 202a/300 in order to transfer the central processing system state information to the SCP subsystem 304, which one of skill in the art in possession of the present disclosure will recognize operates to offload the vast majority of the cloning operations from the non-SCP components of the computing system 202a/300/

Figure 6F:
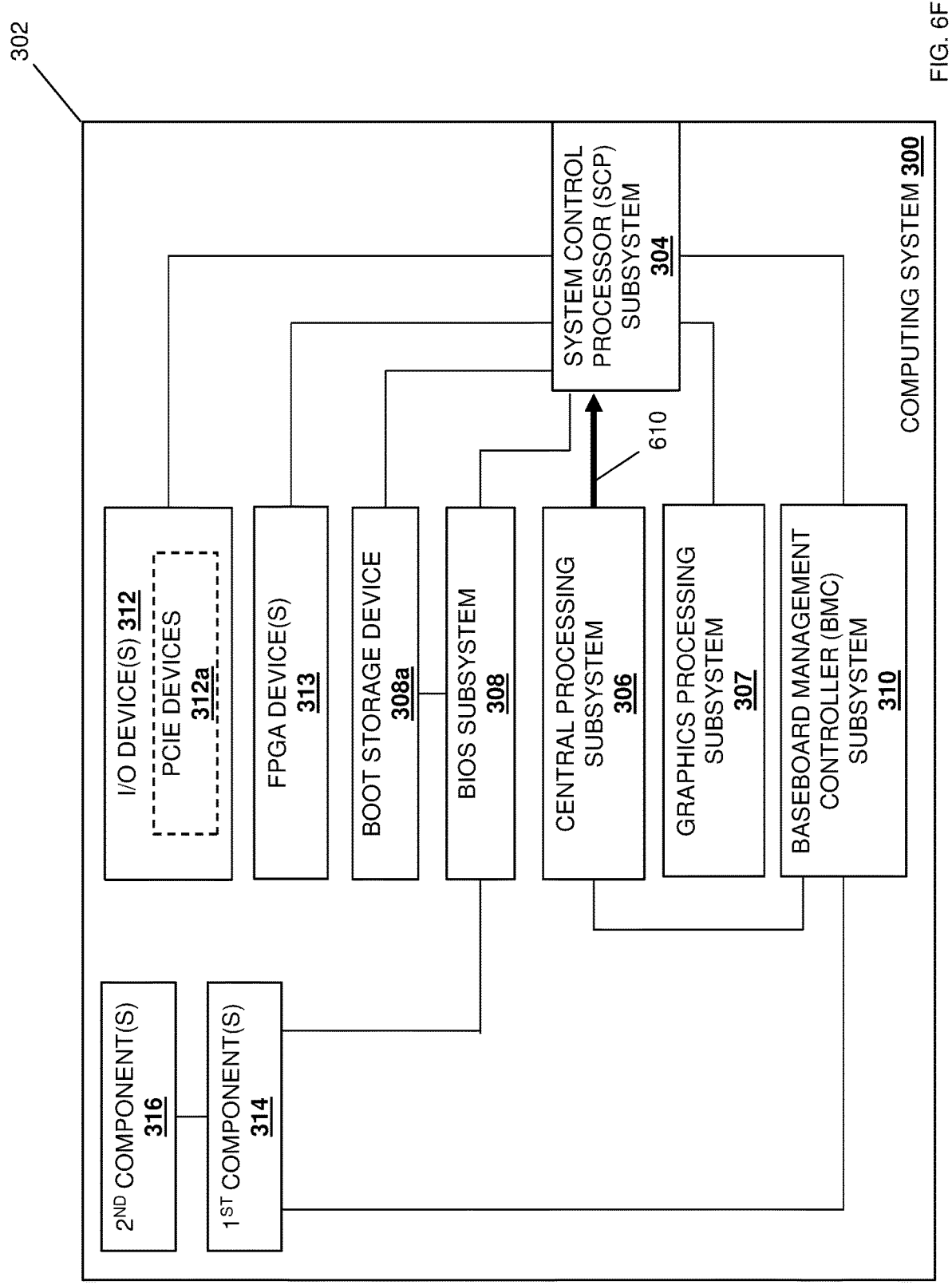
FIG. 6F is a schematic view illustrating an embodiment of the computing system of FIG. 3A operating during the method of FIG. 5.
Figure 6G:
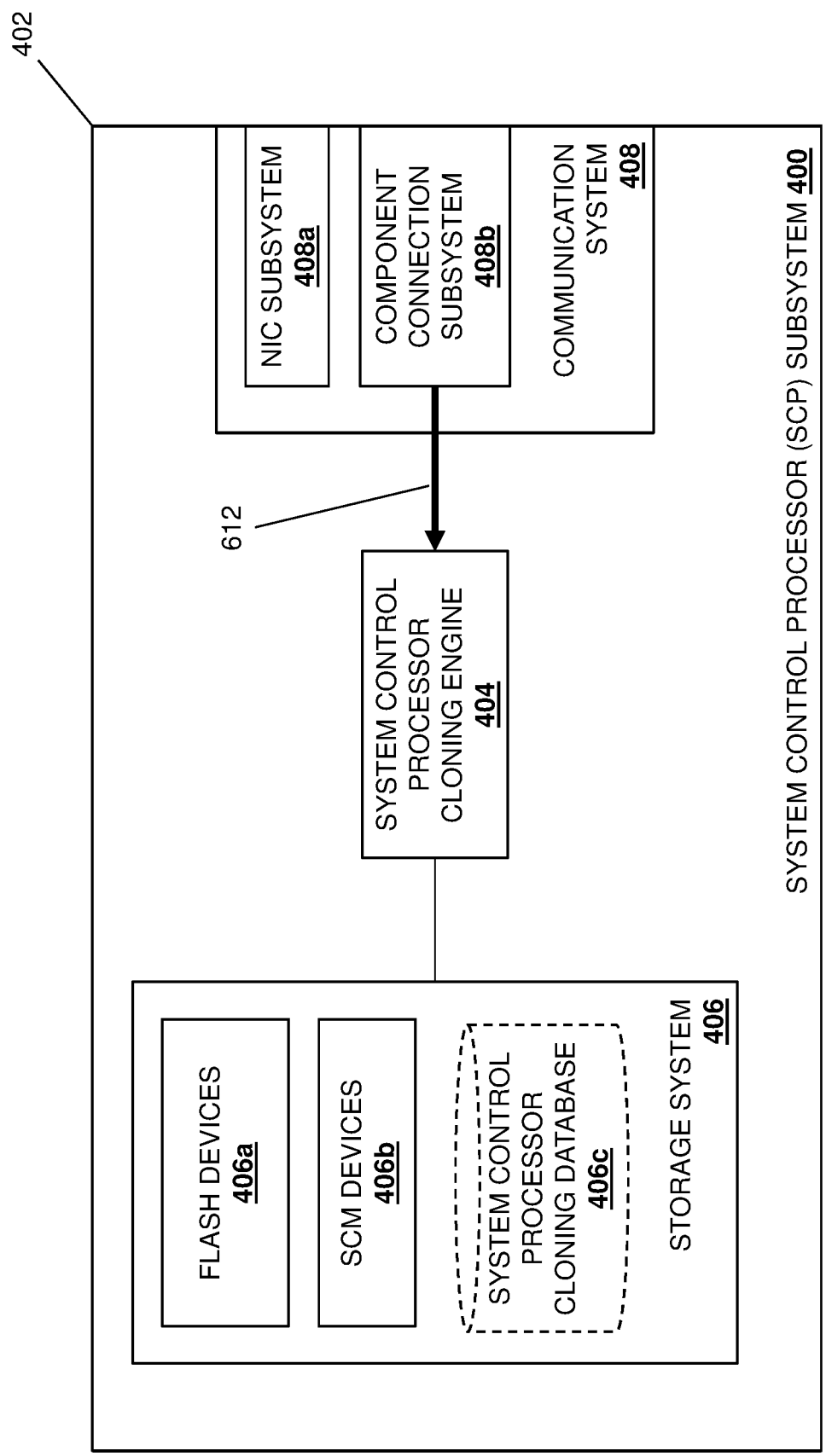
FIG. 6G is a schematic view illustrating an embodiment of the SCP subsystem of FIG. 4 operating during the method of FIG. 5.

Thus, with reference to FIG. 6F and in an embodiment of optional block 508, the central processing system 306 may operate to perform central processing system state information transmission operations 610 in order to transmit central processing system state information to the SCP subsystem 304/400. Furthermore, with reference to FIG. 6G, the SCP cloning engine 404 in the SCP subsystem 304/400 included in the computing system 202a/300 may perform central processing system state information receiving operations 608 to receive the central processing system component state information from the central processing system 306 via the component connection subsystem 408b in the communication system 408. However, while the central processing system 306 has been provided as a specific example of a computing system component that transmits its computing system component state information to the SCP subsystem 304/400, one of skill in the art in possession of the present disclosure will appreciate that other computing system components may transmit their computing system component state information to the SCP subsystem 304/400 while remaining within scope of the present disclosure as well.

Furthermore, while an embodiment has been described in which the SCP subsystem 304/400 cannot retrieve the computing system component state information from all of the computing system component(s) in the computing system 202a/300, and requires those computing system component(s) (or some other subsystem in the computing system 202a/300) to transmit their corresponding computing system component state information to the SCP subsystem 304/400, in other embodiments (e.g., future system architectures) the SCP subsystem 304/400 may have access to the computing system component state information in all of the computing system components that is required to completely clone the computing system 202a/300 (e.g., the SCP subsystem 304/400 may have access to central processing subsystem state information for the central processing system 306 (e.g., x86 host processor state information for an x86 host processor that is stored in an x86 memory that is accessible to the SCP subsystem 304/400), and thus optional block 508 may be skipped. As such, while several specific examples are described, one of skill in the art in possession of the present disclosure will recognize that optional blocks 506 and 508 may include the retrieval/receiving of any state information from the computing system 202a/300 that would allow for the cloning operations discussed above.

Subsequent to block 504, optional block 506, or optional block 508, the method 500 may proceed to block 510 where the first SCP subsystem generates a first SCP subsystem image that is configured for installation on SCP subsystem(s) to configure those SCP subsystem(s) the same as the first SCP subsystem. In an embodiment, at block 510, the SCP cloning engine 404 may utilize the SCP component state information retrieved at block 504 to generate an SCP subsystem image. One of skill in the art in possession of the present disclosure will recognize that the SCP cloning engine 404 may utilize a variety of image-generation techniques with the SCP component state information retrieved at block 504 in order to generate an SCP subsystem image for the SCP subsystem 304 that is configured to be installed on any other SCP subsystem in the networked system 200 in order to configure that SCP subsystem to operate the same as (or substantially similar to) the SCP subsystem 304/400. As will be appreciated by one of skill in the art in possession of the present disclosure, the installation of the SCP subsystem image on any SCP subsystem will configure that SCP subsystem to perform operations in the same (or substantially the same) manner as the SCP subsystem 304/400 by, for example, having that SCP subsystem read the SCP subsystem image and configure its SCP components and its computing system with an exact copy of the state information on that SPC subsystem image, and/or via its performance of other SCP subsystem operations that one of skill in the art in possession of the present disclosure would recognize as falling within the scope of the present disclosure.

The method 500 may then proceed to optional block 512 where the first SCP subsystem may generate a first computing system image that is configured for installation on computing systems to configure those computing systems the same as the first computing system. As discussed above, in some embodiments the cloning functionality provided in the SPC subsystem 304/400 in the computing system 202a/300 according to the teachings of the present disclosure may only provide for the cloning of the SCP subsystem 304/400 in the computing system 202a/300, which one of skill in the art in possession of the present disclosure will appreciate does not require the performance of optional block 512 in order to allow for the cloning of the SCP subsystem 304/400 in the computing system 202a/300 on other SCP subsystems including in the computing systems 202b and up to 202c. As such, in embodiments in which the SPC subsystem 304/400 in the computing system 202a/300 is only providing for the cloning of that SCP subsystem 304/400, optional block 512 may be skipped.

However, as also discussed in further detail below, in some embodiments the cloning functionality provided in the SPC subsystem 304/400 in the computing system 202a/300 according to the teachings of the present disclosure may provide for the cloning of the computing system 202a/300 along with the SCP subsystem 304/400 in the computing system 202a/300, which one of skill in the art in possession of the present disclosure will appreciate may include the performance of optional block 512 in order to allow for the cloning of the combination of that computing system 202a/300 and SCP subsystem 304/400 on other computing system/SCP subsystem combinations in the networked system 200. As such, in embodiments in which the SPC subsystem 304/400 in the computing system 202a/300 is providing for the cloning of itself and the computing system 202a/303, optional block 512 may be performed.

Thus, in an embodiment of optional block 512, the SCP cloning engine 404 may utilize the computing system component state information retrieved at optional block 506 and, in some examples the computing system component state information received at optional block 508, to generate a computing system image. One of skill in the art in possession of the present disclosure will recognize that the SCP cloning engine 404 in the SCP subsystem 304/400 included in the computing system 202a/300 may utilize a variety of image-generation techniques with the computing system component state information in order to generate a computing system image for the computing system 202a/300 that is configured to be installed on any other computing system in the networked system 200 in order to configure that computing system to operate the same as (or substantially similar to) the computing system 202a/300 by, for example, providing that computing system image with the state of processor registers, internal memory, memory directly attached to the processor, any other component directly connected to the processor (and not accessed through its attached SCP), and/or any other component that would be apparent to one of skill in the art in possession of the present disclosure. As will be appreciated by one of skill in the art in possession of the present disclosure, the computing system image may be installed on any computing system to configure that computing system to perform operations in the same (or substantially the same) manner as the computing system 202A/300 by using that computing system image to configure the computing system with a copy of the state of processor registers, internal memory, memory directly attached to the processor, any other component directly connected to the processor (and not accessed through its attached SCP), and/or any other component that would be apparent to one of skill in the art in possession of the present disclosure, and/or via its performance of other computing system operations that one of skill in the art in possession of the present disclosure would recognize as falling within the scope of the present disclosure Subsequent to block 510 or optional block 512, the method 500 may proceed to block 514 where the first SCP subsystem transmits the first SCP subsystem image to a second SCP subsystem in at least one second computing system. For example, at block 514, the SCP cloning engine 404 in the SCP subsystem 304/400 in the computing system 202a/300 may identify one or more SCP subsystems in the computing systems 202b and up to 202c (e.g., based on the cloning command, based on the geometric progression cloning map discussed below, etc.) and, in response, perform operations to establish a connection with those SCP subsystem(s). In a specific example, the SCP cloning engine 404 in the SCP subsystem 304/400 in the computing system 202a/300 and the SCP subsystems in the computing systems 202b and up to 202c may communicate to determine the maximum size of packets of state information that the SCP cloning engine 404 in the SCP subsystem 304/400 in the computing system 202a/300 can format, and that the SCP subsystems in the computing systems 202b and up to 202c can receive, for use in transmitting the SCP subsystem image as discussed below.

In some specific examples, the SCP subsystem image(s) discussed below may include formatted packets of state information. Furthermore, the SCP subsystem image(s) transmitted by the SCP subsystem 304/400 in the computing system 202a/300 to the SCP subsystem(s) in the computing systems 202b and up to 202c may be transmitted according to an SCP-hardware-based platform root-of-trust mechanism that is described by the inventors of the present disclosure in U.S. patent application Ser. No. 17/027,835, filed on Sep. 22, 2020, the disclosure of which is incorporated by reference herein in its entirety. As such, the cloning information (e.g., an SCP subsystem image, formatted state information, etc.) transmitted at block 514 may be "trusted" by the SCP subsystem receiving it based on the root-of-trust operations described in that application (which may include, for example, the SCP subsystem receiving any cloning information packet, verifying the content and a signature in that cloning information packet, etc.). Furthermore, any cloning information transmitted by the SCP subsystem 304/400 in the computing system 202a/300 to the SCP subsystem(s) in the computing systems 202b and up to 202c may be acknowledged by the SCP subsystem receiving it, which may allow the SCP subsystem 304/400 in the computing system 202a/300 to determine when the complete SCP subsystem image and/or all of the state information has been received by any "target" SCP subsystem.

Figure 6H:
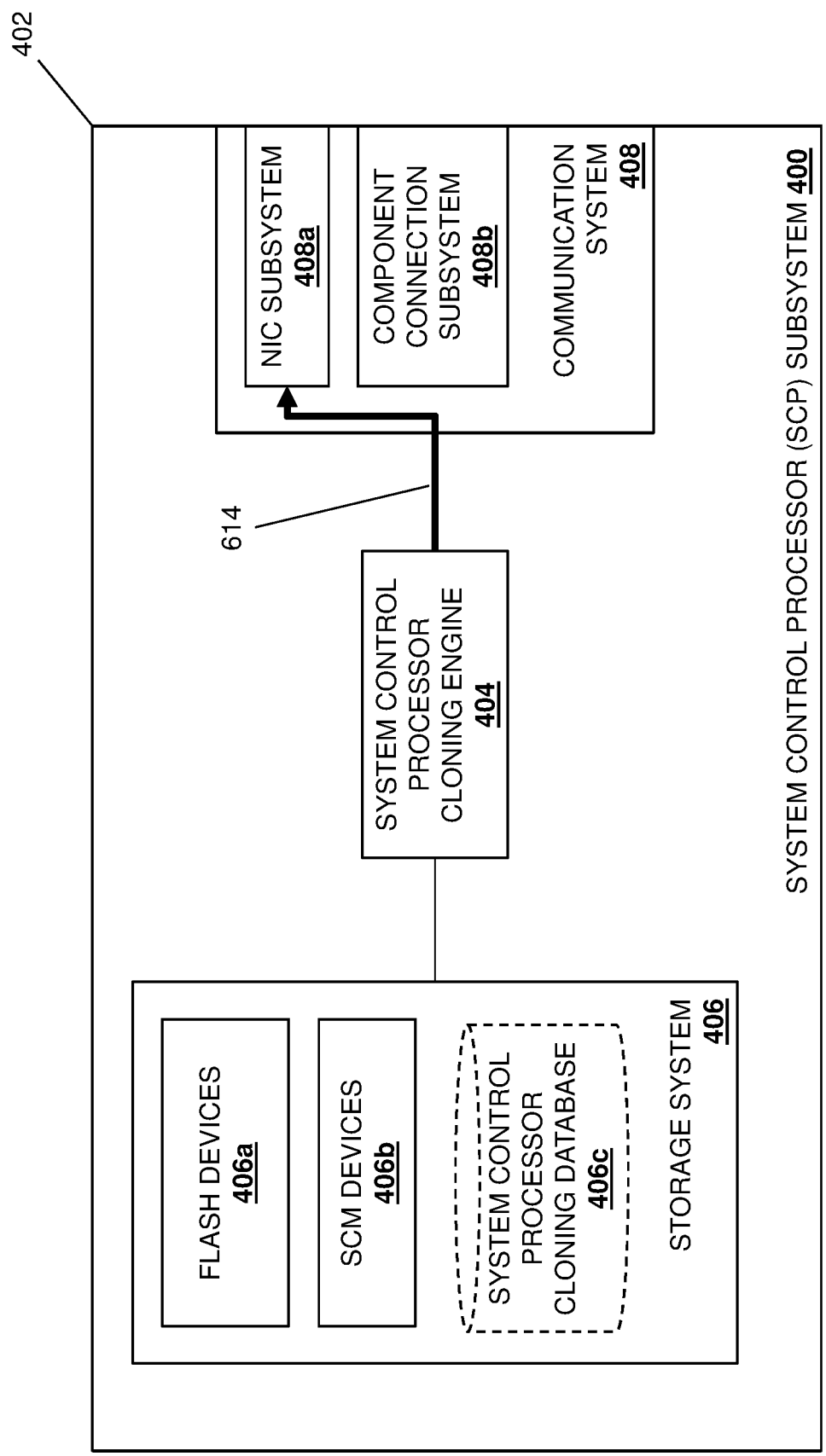
FIG. 6H is a schematic view illustrating an embodiment of the SCP subsystem of FIG. 4 operating during the method of FIG. 5.
Figure 6I:
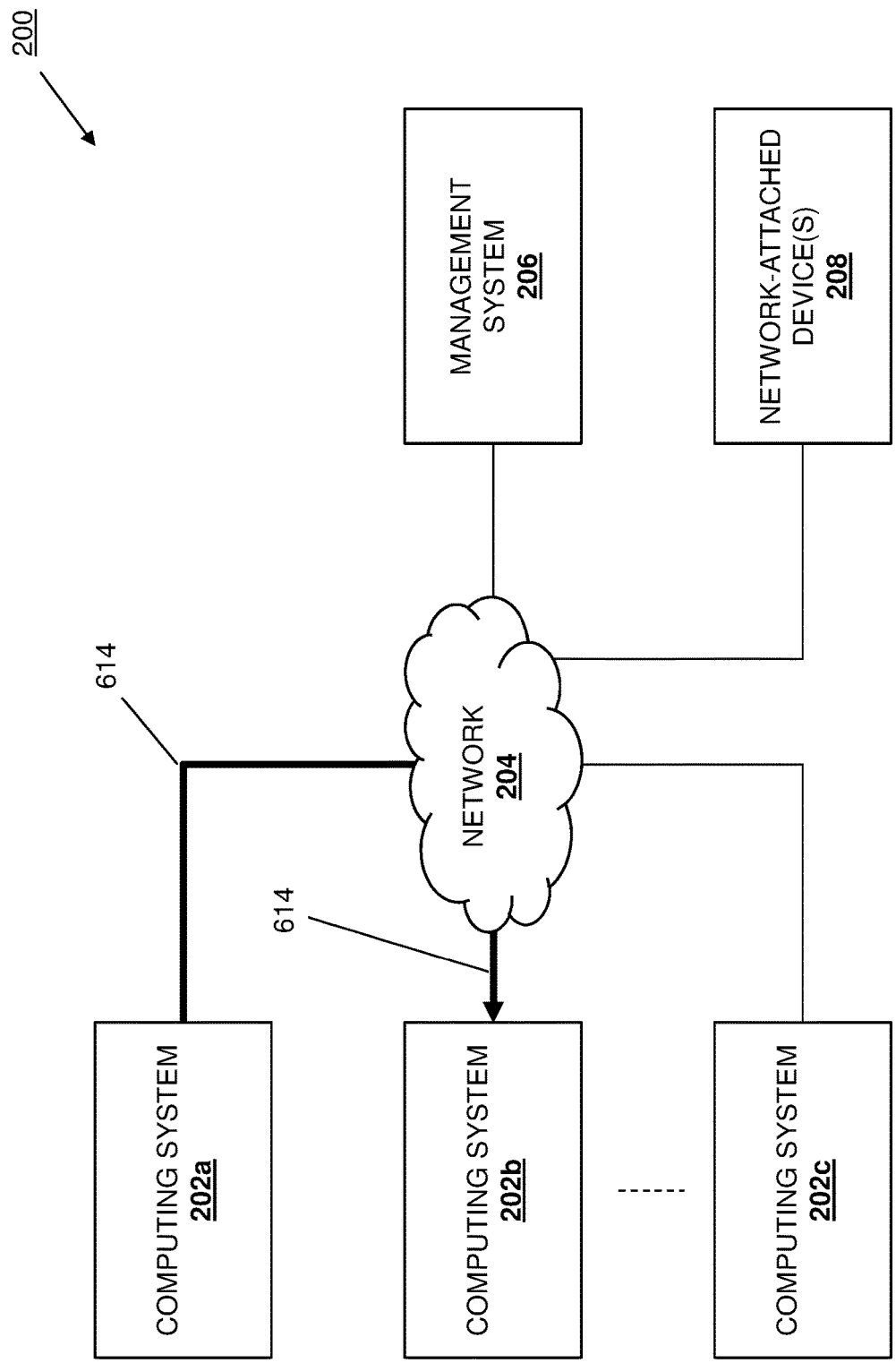
FIG. 6I is a schematic view illustrating an embodiment of the networked system of FIG. 2 operating during the method of FIG. 5.

With reference to FIG. 6H, in an embodiment of block 514, the SCP cloning engine 404 in the SCP subsystem 304/400 in the computing system 202a/300 may perform cloning image transmission operations 614 that include transmitting the SCP subsystem image generated at block 510 via the NIC subsystem 408a in the communication system 408. For example, FIG. 6I illustrates how the cloning image transmission operations 614 may include the SCP cloning engine 404 in the SCP subsystem 304/400 in the computing system 202a/300 transmitting, based on the cloning command received from the management system 206 (e.g., which includes the identities of SCP subsystems in the networked system 200 to which the SCP subsystem 304/400 should be cloned, as discussed above), the SCP subsystem image generated at block 510 through the NIC subsystem 408a in the communication system 408 and via the network 204 to an SCP subsystem in the computing system 202b. As will be appreciated by one of skill in the art in possession of the present disclosure, the SCP subsystem in the computing system 202b may be configured to receive that SCP subsystem image and, in response, install that SCP subsystem image in order to configure that SCP subsystem to operate the same as (or substantially the same as) the SCP subsystem 304/400 in the computing system 202a/300, as discussed above.

In another example, FIG. 6J illustrates how the cloning image transmission operations 614 may include the SCP cloning engine 404 in the SCP subsystem 304/400 in the computing system 202a/300 transmitting, based on the cloning command received from the management system 206 (e.g., which includes the identities of SCP subsystems in the networked system 200 to which the SCP subsystem 304/400 should be cloned as discussed above), the SCP subsystem image generated at block 510 through the NIC subsystem 408a in the communication system 408 and via the network 204 to an SCP subsystem in the computing system 202c. As will be appreciated by one of skill in the art in possession of the present disclosure, the SCP subsystem in the computing system 202c may be configured to receive that SCP subsystem image and, in response, install that SCP subsystem image in order to configure that SCP subsystem to operate the same as (or substantially the same as) the SCP subsystem 304/400 in the computing system 202a/300, as discussed above. Thus, one of skill in the art in possession of the present disclosure will appreciate how the SCP subsystem image generated at block 510 may be transmitted to any SCP subsystem included in a computing system in the networked system 200, and installed on that SCP subsystem in order to configure that SCP subsystem to operate the same as (or substantially the same as) the SCP subsystem 304/400 in the computing system 202a/300 as discussed above.

The method 500 may then proceed to optional block 516 where the first SCP subsystem may transmit the first computing system image to at least one second computing system. As discussed above, in some embodiments the cloning functionality provided in the SPC subsystem 304/400 in the computing system 202a/300 according to the teachings of the present disclosure may only provide for the cloning of the SCP subsystem 304/400 in the computing system 202a/300, which one of skill in the art in possession of the present disclosure will appreciate does not require the performance of optional block 516 in order to allow for the cloning of the SCP subsystem 304/400 in the computing system 202a/300 on other SCP subsystems including in the computing systems 202b and up to 202c. As such, in embodiments in which the SPC subsystem 304/400 in the computing system 202a/300 is only providing for the cloning of the SCP subsystem 304/400, optional block 512 may be skipped. Thus, one of skill in the art in possession of the present disclosure will appreciate that some embodiments of the systems and methods of the present disclosure may provide for the cloning of SCP subsystems in computing systems even when those computing systems are not being cloned as well. However, one of skill in the art in possession of the present disclosure will also appreciate that some embodiments of the systems and methods of the present disclosure may provide for the cloning of SCP subsystems in computing systems, while conventional computing system cloning techniques (e.g., cloning software provided on the computing system 202a) may be utilized to clone the computing systems (to clone the computing system 202a on the computing systems 202b and up to 202c) in which those SCP subsystems are provided.

However, as also discussed in further detail below, in some embodiments the cloning functionality provided in the SPC subsystem 304/400 in the computing system 202a/300 according to the teachings of the present disclosure may provide for the cloning of the computing system 202a/300 along with the SCP subsystem 304/400 in the computing system 202a/300, which one of skill in the art in possession of the present disclosure will appreciate may include the performance of optional block 516 in order to allow for the cloning of the combination of that computing system 202a/300 and SCP subsystem 304/400 on other computing system/SCP subsystem combinations in the networked system 200. As such, in embodiments in which the SPC subsystem 304/400 in the computing system 202a/300 is providing for the cloning of itself and the computing system 202a/300, optional block 516 may be performed.

With reference back to FIG. 6H, in an embodiment of optional block 516, the cloning image transmission operations 614 performed by the SCP cloning engine 404 in the SCP subsystem 304/400 in the computing system 202a/300 may include transmitting the computing system image generated at optional block 512 via the NIC subsystem 408a in the communication system 408. For example, with reference back to FIG. 6I, the cloning image transmission operations 614 may include the SCP cloning engine 404 in the SCP subsystem 304/400 in the computing system 202a/300 transmitting, based on the cloning command received from the management system 206 (e.g., which includes the identities of computing systems in the networked system 200 to which the computing system 202a/300 should be cloned as discussed above), the computing system image generated at optional block 512 through the NIC subsystem 408a in the communication system 408 and via the network 204 to an SCP subsystem in the computing system 202b. As will be appreciated by one of skill in the art in possession of the present disclosure, the SCP subsystem in the computing system 202b may be configured to receive that computing system image and, in response, install that computing system image on the computing system 202b in order to configure the computing system 202b to operate the same as (or substantially the same as) the computing system 202a/300 as discussed above.

In another example, with reference back to FIG. 6J, the cloning image transmission operations 614 may include the SCP cloning engine 404 in the SCP subsystem 304/400 in the computing system 202a/300 transmitting, based on the cloning command received from the management system 206 (e.g., which includes the identities of computing systems in the networked system 200 to which the computing system 202a/300 should be cloned as discussed above), the computing system image generated at optional block 512 through the NIC subsystem 408a in the communication system 408 and via the network 204 to an SCP subsystem in the computing system 202c. As will be appreciated by one of skill in the art in possession of the present disclosure, the SCP subsystem in the computing system 202c may be configured to receive that computing system image and, in response, install that computing system image on the computing system 202c in order to configure the computing system 202c to operate the same as (or substantially the same as) the computing system 202a/300 as discussed above. Thus, one of skill in the art in possession of the present disclosure will appreciate how the computing system image generated at optional block 512 may be transmitted to any SCP subsystem included in a computing system in the networked system 200, and installed on that computing system in order to configure that computing system to operate the same as (or substantially the same as) the computing system 202a/300, as discussed above.

Figure 7:
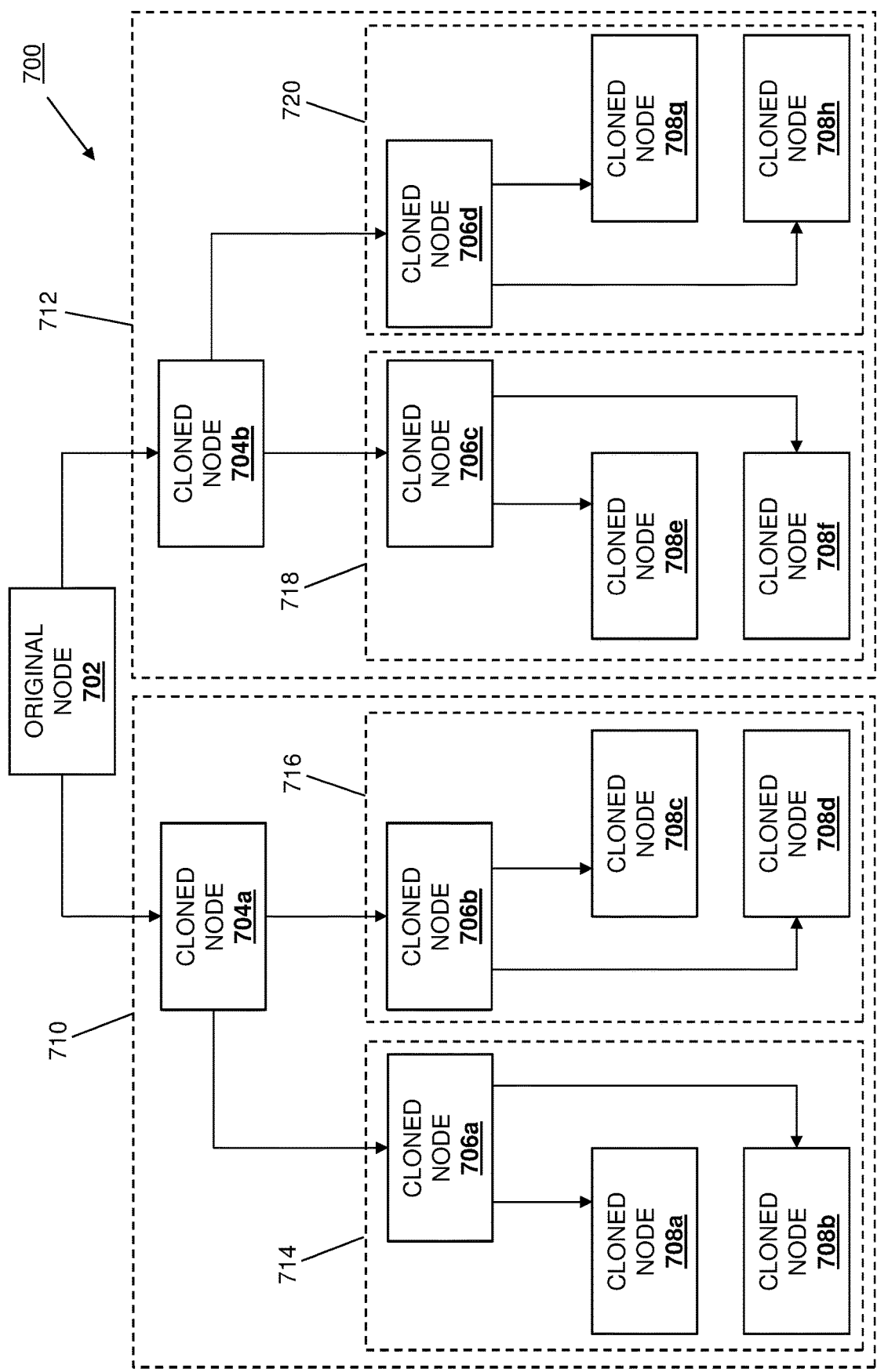
FIG. 7 is a schematic view illustrating an embodiment of a geometric progression cloning map that may be used during the method of FIG. 5.

With reference to FIG. 7, a geometric progression cloning map 700 is illustrated that may be generated by the management system 206 and provided with the cloning command received by the SCP subsystem 304/400 in the computing system 202a/300 at block 502. As will be appreciated by one of skill in the art in possession of the present disclosure, the geometric progression cloning map 700 may direct how an SCP subsystem and/or computing system should be cloned on other SCP subsystems/computing systems, and in the illustrated embodiment identifies an original node 702 (which may be the SCP subsystem 304/400 in the computing system 202a/300, and in some embodiments the computing system 202a/300 as well, discussed in the examples above) that is being cloned, as well as a plurality of cloned nodes (e.g., the SCP subsystems in the computing systems 202b and up to 202c, and in some embodiments the computing systems 202b and up to 202c as well, discussed in the examples above) that are cloned from the original node as described above.

As will be appreciated by one of skill in the art in possession of the present disclosure, the specific example of the geometric progression cloning map 700 illustrated in FIG. 7 may instruct the original node 702 to clone itself on the cloned nodes 704a and 704b, while having the cloned node 704a clone itself on the cloned nodes 706a and 706b, and having the cloned node 704b clone itself on the cloned nodes 706c and 706d, and while having the cloned node 706a clone itself on the cloned nodes 708a and 708b, having the cloned node 706b clone itself on the cloned nodes 708c and 708d, having the cloned node 706c clone itself on the cloned node 708e and 708f, and having the cloned node 706d clone itself on the cloned nodes 708g and 708h.

As such, in this specific example, the SCP cloning engine 404 in the SCP subsystem 400 included in the original node 702 may receive the cloning command at block 502, identify the geometric progression cloning map 700 in the cloning command and, in response, perform the cloning operations discussed above to transmit the SCP subsystem image and/or the computing system image to the SCP subsystems in the cloned nodes 704a and 704b. Furthermore, in addition to transmitting the SCP subsystem image and/or the computing system image to the SCP subsystems in the cloned nodes 704a and 704b, the SCP cloning engine 404 in the SCP subsystem 400 included in the original node 702 may also generate and transmit respective cloning commands to each of the SCP subsystems in the cloned nodes 704a and 704b according to the geometric progression cloning map 700. For example, FIG. 7 identifies a first truncated geometric progression cloning map 710 that may be transmitted by the SCP cloning engine 404 in the SCP subsystem 400 included in the original node 702 to the cloned node 704a, with the first truncated geometric progression map 710 instructing the cloned node 704a to clone itself (e.g., using the image(s)

generated by and received from the original node 700) on the cloned nodes 706*a* and 706*b*, while having the cloned node 706*a* clone itself on the cloned nodes 708*a* and 708*b*, and having the cloned node 706*b* clone itself on the cloned nodes 708*c* and 708*d*. Similarly, FIG. 7 also identifies a second truncated geometric progression cloning map 712 that may be transmitted by the SCP cloning engine 404 in the SCP subsystem 400 included in the original node 702 to the cloned node 704*b*, with the second truncated geometric progression map 712 instructing the cloned node 704*b* to clone itself (e.g., using the image(s) generated by and received from the original node 700) on the cloned nodes 706*c* and 706*d*, while having the cloned node 706*c* clone itself on the cloned nodes 708*e* and 708*f*, and having the cloned node 706*d* clone itself on the cloned nodes 708*g* and 708*h*.

Further still, SCP subsystems in cloned nodes receiving cloning commands with truncated geometric progression maps may themselves transmit cloning commands and truncated geometric progression maps to other cloned nodes as well. For example, FIG. 7 identifies a third truncated geometric progression cloning map 714 that may be transmitted by the SCP cloning engine in the SCP subsystem included in the cloned node 704*a* and that instructs the cloned node 706*a* to clone itself (e.g., using the image(s) generated by the original node 700) on the cloned nodes 708*a* and 708*b*, a fourth truncated geometric progression cloning map 716 that may be transmitted by the SCP cloning engine in the SCP subsystem included in the cloned node 704*a* to the cloned node 706*b* and that instructs the cloned node 706*b* to clone itself (e.g., using the image(s) generated by the original node 700) on the cloned nodes 708*c* and 708*d*, a fifth truncated geometric progression cloning map 718 that may be transmitted by the SCP cloning engine in the SCP subsystem included in the cloned node 704*b* to the cloned node 706*c* and that instructs the cloned node 706*c* to clone itself (e.g., using the image(s) generated by the original node 700) on the cloned nodes 708*e* and 708*f*, and a sixth truncated geometric progression cloning map 720 that may be transmitted by the SCP cloning engine in the SCP subsystem included in the cloned node 704*b* to the cloned node 706*d* and that instructs the cloned node 706*d* to clone itself (e.g., using the image(s) generated by the original node 700) on the cloned nodes 708*g* and 708*h*.

As such, one of skill in the art in possession of the present disclosure will recognize how cloning operations performed according to the teachings of the present disclosure and using the geometric progression cloning map may reduce the time needed to clone SCP subsystems and/or computing systems, reduced or eliminate network bottlenecks, and/or remedy other cloning issues that would be apparent to one of skill in the art in possession of the present disclosure. Furthermore, while a specific example of the geometric progression cloning map has been illustrated and described, one of skill in the art in possession of the present disclosure will appreciate that the geometric progression cloning map of the present disclosure may provide for any of a variety of cloning operations based on associated cloning needs. For example, while the geometric progression cloning map 700 discussed above only illustrates and describes the original node 702 cloning itself to two nodes (i.e., the cloned nodes 704*a* and 704*b*), the original node 702 (or any node that has been cloned from the original node) may continue to clone itself on other nodes until the number of desired cloned nodes are created. As such, the geometric progression cloning map may be configured to have any node clone itself while preventing multiple nodes from cloning themselves to the same node, until the desired number of cloned nodes are created. Furthermore, original or cloned nodes may be configured to identify which nodes to clone themselves to (e.g., based on the geometric progression cloning map instructing that node to clone itself some number of times), or the geometric progression cloning map may specifically identify the exact node(s) any particular node should clone itself to.

In some embodiments, the cloning commands and/or the geometric progression cloning maps discussed above may be "location-aware" in order to conserve computing resources, network bandwidth, and/or provide other efficiencies that would be apparent to one of skill in the art in possession of the present disclosure. For example, nodes involved in the cloning operations discussed above may be located in the same datacenter and/or across datacenters, and the cloning commands and/or geometric progression cloning maps may be configured to localize any data traffic associated with the cloning operations discussed above by preventing nodes from cloning themselves across a datacenter or between datacenters, and ensuring that nodes clone themselves on other nodes that are relatively physically close. As such, the SCP cloning engine in an SCP subsystem included in a node may be configured to identify one or more cloned node relative location requirements in a cloning command and, based on other nodes satisfying the one or more cloned node relative location requirements, transmit the cloning image(s) to those nodes. However, while a specific example is provided, one of skill in the art in possession of the present disclosure will recognize how the cloning commands and/or geometric progression cloning maps may utilize a variety of techniques for providing the "location-aware" cloning operations discussed above while remaining within the scope of the present disclosure as well.

Thus, systems and methods have been described that provide an SCP subsystem that includes built-in cloning functionality that provides for the copying of state information from SCP components in the SCP subsystem in order to allow for the cloning of that SCP subsystem along with the cloning of the server device in which it is provided, which allows server device/SCP subsystem combinations to be cloned on other server device/SCP subsystem combinations. For example, the SCP cloning system of the present disclosure includes a first server device with a first SCP subsystem coupled to a central processing system and first server device components in the first server device. The first SCP subsystem receives a first cloning command via a network from a management system and, based on the first cloning command, retrieves respective first SCP component state information from each of a plurality of first SCP components that are included in the first SCP subsystem, uses the respective first SCP component state information to generate a first SCP subsystem image that is configured for installation on an SCP subsystem to configure that SCP subsystem the same as the first SCP subsystem, and transmits the first SCP subsystem image to a second SCP subsystem in each of at least one second server device via the network. Furthermore, in some embodiments, the cloning functionality in the SCP subsystem may provide for the copying of state information from server device components in the server device in order to allow for the cloning of the server device as well, thus offloading (or substantially offloading) cloning operations from that server device Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A System Control Processor (SCP) cloning system, comprising:
   at least one second computing system including a second System Control Processor (SCP) subsystem; and
   a first computing system that is coupled to each of the at least one second computing systems via a network, wherein the first computing system includes:
   a central processing system;
   a plurality of first computing system components; and
   a first SCP subsystem that is coupled to the central processing system and each of the plurality of first computing system components, wherein the first SCP subsystem is configured to:
      receive, via the network from a management system, a first cloning command;
      retrieve, based on the first cloning command;
         respective first SCP component state information from each of a plurality of first SCP components that are included in the first SCP subsystem; and
         respective first computing system component state information from each of the plurality of first computing system components that are included in the first computing system;
      generate, using the respective first SCP component state information and based on the first cloning command, a first SCP subsystem image that is configured for installation on an SCP subsystem to configure that SCP subsystem the same as the first SCP subsystem;
      generate, using the respective first computing system component state information and based on the first cloning command, a first computing system image that is configured for installation on a computing system to configure that computing system the same as the first computing system; and
      transmit, based on the first cloning command, the first SCP subsystem image to the second SCP subsystem in each of the at least one second computing systems, and the first computing system image to each of the at least one second computing systems.

2. The system of claim 1, wherein the plurality of first SCP components include at least one SCP storage device, at least one SCP processing device, and at least one SCP memory device, and
   wherein the respective first SCP component state information includes first SCP subsystem settings information, data included in the at least one SCP storage device, programming instructions provided with the at least one SCP processor device, and data included in the at least one SCP memory device.

3. The system of claim 1, wherein the first SCP subsystem is configured to:
   receive, from a first computing system cloning subsystem in the first computing system, central processing system state information associated with the central processing system in the first computing system; and
   generate, using the respective first computing system component state information and the central processing system state information and based on the first cloning command, a first computing system image that is configured for installation on a computing system to configure that computing system the same as the first computing system.

4. The system of claim 1, wherein the plurality of first computing system components include a Field Programmable Gate Array (FPGA) device, a graphics processing system, a Basic Input/Output System (BIOS) subsystem, and a boot storage device, and
   wherein the respective first computing system component state information includes programming instructions provided with the FPGA device, data included in the graphics processing system, BIOS settings included in the BIOS subsystem, and a boot image included in the boot storage device.

5. The system of claim 4, wherein the plurality of first computing system components include a Baseboard Management Controller (BMC) subsystem, and
   wherein the respective first computing system component state information includes BMC settings included in the BMC subsystem, and data included in the BMC subsystem.

6. The system of claim 1, wherein the first SCP subsystem is configured to:
   transmit, along with the first SCP subsystem image, a second cloning command to the second SCP subsystem in at least one of the at least one second computing systems, wherein the second cloning command is configured to cause that second SCP subsystem to transmit the first SCP subsystem image to a third SCP subsystem included in a third computing system.

7. A System Control Processor (SCP) subsystem, comprising:
   a System Control Processor (SCP) processing system; and
   an SCP memory system that is coupled to the SCP processing system and that includes instructions that, when executed by the SCP processing system, cause the SCP processing system to provide an SCP cloning engine that is configured to:
      receive, via a network from a management system, a first cloning command;
      retrieve, based on the first cloning command:
         respective first SCP component state information from each of a plurality of first SCP components that are included in a first SCP subsystem; and
         respective first computing system component state information from each of a plurality of first computing system components that are included in a first computing system that includes the first SCP subsystem;
      generate, using the respective first SCP component state information and based on the first cloning command, a first SCP subsystem image that is configured for installation on an SCP subsystem to configure that SCP subsystem the same as the first SCP subsystem;
      generate, using the respective first computing system component state information and based on the first cloning command, a first computing system image that is configured for installation on a computing system to configure that computing system the same as the first computing system; and
      transmit, based on the first cloning command, the first SCP subsystem image to a second SCP subsystem in each of at least one second computing system, and the first computing system image to each of the at least one second computing systems.

8. The SCP subsystem of claim 7, wherein the plurality of SCP components include at least one SCP storage device, at least one SCP processing device in the SCP processing system, and at least one SCP memory device in the SCP memory system, and
  wherein the respective SCP component state information includes first SCP subsystem settings information, data included in the at least one SCP storage device, programming instructions provided with the at least one SCP processor device, and data included in the at least one SCP memory device.

9. The SCP subsystem of claim 7, wherein the SCP cloning engine is configured to:
  receive, from a first computing system cloning subsystem in the first computing system, central processing system state information associated with a central processing system in the first computing system; and
  generate, using the respective first computing system component state information and the central processing system state information and based on the first cloning command, a first computing system image that is configured for installation on a computing system to configure that computing system the same as the first computing system.

10. The SCP subsystem of claim 7, wherein the plurality of first computing system components include a Field Programmable Gate Array (FPGA) device, a graphics processing system, a Basic Input/Output System (BIOS) subsystem, and a boot storage device, and
  wherein the respective first computing system component state information includes programming instructions provided with the FPGA device, data included in the graphics processing system, BIOS settings included in the BIOS subsystem, and a boot image included in the boot storage device.

11. The SCP subsystem of claim 10, wherein the plurality of first computing system components include a Baseboard Management Controller (BMC) subsystem, and
  wherein the respective first computing system component state information includes BMC settings included in the BMC subsystem, and data included in the BMC subsystem.

12. The SCP subsystem of claim 7, wherein the SCP cloning engine is configured to:
  transmit, along with the first SCP subsystem image, a second cloning command to the second SCP subsystem in at least one of the at least one second computing systems, wherein the second cloning command is configured to cause that second SCP subsystem to transmit the first SCP subsystem image to a third SCP subsystem included in a third computing system.

13. The SCP subsystem of claim 7, wherein the SCP cloning engine is configured to:
  identify, in the first cloning command, one or more cloned device relative location requirements; and
  select, based on the second SCP subsystem in each of the at least one second computing systems satisfying the one or more cloned device relative location requirements, the second SCP subsystem in each of the at least one second computing systems for transmitting the first SCP subsystem image.

14. A method for cloning a System Control Processor (SCP) subsystem, comprising:
  receiving, by a first System Control Processor (SCP) subsystem included in a first computing system and via a network from a management system, a first cloning command;
  retrieving, by the first SCP subsystem based on the first cloning command:
    respective first SCP component state information from each of a plurality of first SCP components that are included in a first SCP subsystem; and
    respective first computing system component state information from each of a plurality of first computing system components that are included in a first computing system that includes the first SCP subsystem;
  generating, by the first SCP subsystem using the respective first SCP component state information and based on the first cloning command, a first SCP subsystem image that is configured for installation on an SCP subsystem to configure that SCP subsystem the same as the first SCP subsystem;
  generating, by the first SCP subsystem using the respective first computing system component state information and the central processing system state information and based on the first cloning command, a first computing system image that is configured for installation on a computing system to configure that computing system the same as the first computing system; and
  transmitting, by the first SCP subsystem based on the first cloning command, the first SCP subsystem image to a second SCP subsystem in each of at least one second computing system, and the first computing system image to each of the at least one second computing systems.

15. The method of claim 14, wherein the plurality of SCP components include at least one SCP storage device, at least one SCP processing device in the SCP processing system, and at least one SCP memory device in the SCP memory system, and
  wherein the respective SCP component state information includes first SCP subsystem settings information, data included in the at least one SCP storage device, programming instructions provided with the at least one SCP processor device, and data included in the at least one SCP memory device.

16. The method of claim 14, further comprising:
  receiving, by the first SCP subsystem from a first computing system cloning subsystem in the first computing system, central processing system state information associated with a central processing system in the first computing system; and
  generating, by the first SCP subsystem using the respective first computing system component state information and the central processing system state information and based on the first cloning command, a first computing system image that is configured for installation on a computing system to configure that computing system the same as the first computing system.

17. The method of claim 14, wherein the plurality of first computing system components include a Field Programmable Gate Array (FPGA) device, a graphics processing system, a Basic Input/Output System (BIOS) subsystem, and a boot storage device, and
  wherein the respective first computing system component state information includes programming instructions provided with the FPGA device, data included in the graphics processing system, BIOS settings included in the BIOS subsystem, and a boot image included in the boot storage device.

18. The method of claim 17, wherein the plurality of first computing system components include a Baseboard Management Controller (BMC) subsystem, and wherein the respective first computing system component state information includes BMC settings included in the BMC subsystem, and data included in the BMC subsystem.

19. The method of claim 14, further comprising:
transmitting, by the first SCP subsystem along with the first SCP subsystem image, a second cloning command to the second SCP subsystem in at least one of the at least one second computing systems, wherein the second cloning command is configured to cause that second SCP subsystem to transmit the first SCP subsystem image to a third SCP subsystem included in a third computing system.

20. The method of claim 14, further comprising:
identifying, by the first SCP subsystem in the first cloning command, one or more cloned device relative location requirements; and
selecting, by the first SCP subsystem based on the second SCP subsystem in each of the at least one second computing systems satisfying the one or more cloned device relative location requirements, the second SCP subsystem in each of the at least one second computing systems for transmitting the first SCP subsystem image.

* * * * *